(12) United States Patent
Lippey et al.

(10) Patent No.: US 7,515,336 B2
(45) Date of Patent: Apr. 7, 2009

(54) SELECTIVE REFLECTING

(75) Inventors: Barret Lippey, Belmont, MA (US);
Mark Kniffin, Brookline, MA (US);
Stephen R. O'Dea, Wilmington, MA (US)

(73) Assignee: Bose Corporation, Framingham, MA (US)

( * ) Notice: Subject to any disclaimer, the term of this patent is extended or adjusted under 35 U.S.C. 154(b) by 113 days.

(21) Appl. No.: 10/789,695

(22) Filed: Feb. 27, 2004

(65) Prior Publication Data

US 2004/0233524 A1    Nov. 25, 2004

Related U.S. Application Data

(63) Continuation-in-part of application No. 10/028,063, filed on Dec. 21, 2001, now Pat. No. 6,847,483.

(51) Int. Cl.
*G03B 21/56* (2006.01)
(52) U.S. Cl. ............................... 359/443; 359/449
(58) Field of Classification Search ................ 359/449, 359/459
See application file for complete search history.

(56) References Cited

U.S. PATENT DOCUMENTS

| | | | |
|---|---|---|---|
| 1,998,054 A | 4/1935 | McBurney | |
| 2,590,906 A | 4/1952 | Tripp | |
| 3,314,742 A | 4/1967 | Morgan | |
| 3,556,640 A | 1/1971 | Austin | |
| 3,712,708 A | 1/1973 | Brown | |
| 3,942,869 A * | 3/1976 | Portner et al. ............... | 359/443 |
| RE29,091 E | 12/1976 | De Palma et al. | |
| 4,190,320 A | 2/1980 | Ferro | |
| 4,206,969 A | 6/1980 | Cobb et al. | |
| 4,312,939 A | 1/1982 | McCole ...................... | 430/497 |
| 4,979,803 A | 12/1990 | McGuckin et al. | |
| 5,148,309 A * | 9/1992 | Yamada et al. ............... | 359/443 |
| 5,193,015 A | 3/1993 | Shanks | |
| 5,214,530 A | 5/1993 | Coombs et al. | |
| 5,335,022 A | 8/1994 | Braun et al. | |

(Continued)

FOREIGN PATENT DOCUMENTS

DE        4442045        5/1996

(Continued)

OTHER PUBLICATIONS

Shimoda, K., "Multi-Layer Dichroic Coating on Plastic Webs," *Proceedings of Thirteenth International Conference on Vacuum Web Coating*, R. Bakish, Ed., pp. 58-67, Tucson, AZ, Oct. 17-19, 1999.

(Continued)

*Primary Examiner*—Christopher Mahoney

(57) ABSTRACT

A projection screen that includes a multilayer, multiband, single stack device that selectively reflects light with wavelengths in plurality of narrow wavelength bands, and methods for making the screen. The multilayer, multiband, single stack device may be an etalon device. The multiple layers may be deposited on a diffusing substrate. The projection screen may also include a polarizer that coacts with a projector. The projector polarizes the projected light in the narrow wavelength bands into the same polarity and the screen reflects the light with the same polarization and does not reflect light of another polarization. The polarizer may include substrate with a thin polarizing coating. The screen may include a matte surfaced diffuser.

15 Claims, 31 Drawing Sheets

U.S. PATENT DOCUMENTS

| | | | |
|---|---|---|---|
| 5,361,163 A * | 11/1994 | Matsuda et al. | 359/452 |
| 5,383,995 A | 1/1995 | Phillips et al. | |
| 5,389,982 A | 2/1995 | Lee | |
| 5,400,174 A | 3/1995 | Pagis et al. | |
| 5,416,617 A | 5/1995 | Loiseaux et al. | |
| 5,473,469 A | 12/1995 | Magocs et al. | |
| 5,486,884 A | 1/1996 | De Vaan | |
| 5,497,207 A | 3/1996 | Kim | |
| 5,526,063 A | 6/1996 | Joubert et al. | |
| 5,568,316 A | 10/1996 | Schrenk et al. | |
| 5,570,213 A | 10/1996 | Ruiz et al. | |
| 5,571,624 A | 11/1996 | Phillips et al. | |
| 5,625,494 A | 4/1997 | Fukushima et al. | |
| 5,646,781 A | 7/1997 | Johnson, Jr. | |
| 5,715,083 A | 2/1998 | Takayama | |
| 5,726,805 A | 3/1998 | Kaushik et al. | |
| 5,731,898 A | 3/1998 | Orzi et al. | |
| 5,739,296 A | 4/1998 | Gvon et al. | |
| 5,760,954 A | 6/1998 | Tatsuki et al. | |
| 5,765,934 A | 6/1998 | Okamori et al. | |
| 5,768,019 A | 6/1998 | Niwa et al. | |
| 5,832,146 A | 11/1998 | Bruno | |
| 5,875,012 A | 2/1999 | Crawford et al. | |
| 5,877,895 A | 3/1999 | Shaw et al. | |
| 5,880,800 A | 3/1999 | Mikura et al. | |
| 5,914,817 A | 6/1999 | Browning et al. | |
| 6,018,419 A | 1/2000 | Cobb, Jr. et al. | |
| 6,023,369 A | 2/2000 | Goto | |
| 6,031,653 A | 2/2000 | Wang | |
| 6,072,549 A | 6/2000 | Faris et al. | |
| 6,157,486 A * | 12/2000 | Benson et al. | 359/498 |
| 6,163,402 A | 12/2000 | Chou et al. | |
| 6,164,858 A | 12/2000 | Kaufmann | |
| 6,183,091 B1 | 2/2001 | Johnson et al. | |
| 6,208,463 B1 | 3/2001 | Hansen et al. | |
| 6,215,592 B1 * | 4/2001 | Pelekhaty | 359/618 |
| 6,248,448 B1 | 6/2001 | Lippey et al. | |
| 6,249,378 B1 | 6/2001 | Shimamura et al. | |
| 6,282,023 B1 | 8/2001 | Bergman | |
| 6,284,382 B1 | 9/2001 | Ishikawa et al. | |
| 6,288,172 B1 | 9/2001 | Goetz et al. | |
| 6,288,842 B1 | 9/2001 | Florczak et al. | |
| 6,307,675 B1 | 10/2001 | Abe et al. | |
| 6,317,189 B1 | 11/2001 | Yuan et al. | |
| 6,339,464 B1 | 1/2002 | Anderson et al. | |
| 6,375,330 B1 | 4/2002 | Mihalakis | |
| 6,381,068 B1 | 4/2002 | Harada et al. | |
| 6,391,068 B2 | 5/2002 | Yoshida et al. | |
| 6,392,766 B1 | 5/2002 | Gnaedig et al. | |
| 6,398,389 B1 | 6/2002 | Bohler | |
| 6,414,727 B1 | 7/2002 | Benton | |
| 6,421,174 B1 | 7/2002 | Ooshima et al. | |
| 6,428,169 B1 | 8/2002 | Deter et al. | 353/20 |
| 6,449,089 B1 | 9/2002 | Moshrefzadeh et al. | |
| 6,525,877 B1 | 2/2003 | Clabburn et al. | |
| 6,529,322 B1 | 3/2003 | Jones et al. | |
| 6,530,667 B1 | 3/2003 | Idaszak et al. | |
| 6,561,654 B2 | 5/2003 | Mukawa et al. | |
| 6,590,710 B2 | 7/2003 | Hara et al. | |
| 6,618,199 B2 | 9/2003 | Cook | |
| 6,648,475 B1 | 11/2003 | Roddy et al. | |
| 6,650,455 B2 | 11/2003 | Miles | |
| 6,674,562 B1 | 1/2004 | Miles | |
| 6,680,792 B2 | 1/2004 | Miles | |
| 6,688,747 B2 | 2/2004 | Wichner et al. | |
| 6,733,139 B2 | 5/2004 | Childers | |
| 6,769,774 B2 | 8/2004 | McDowell | |
| 6,831,784 B2 * | 12/2004 | Takeda | 359/579 |
| 6,847,483 B2 | 1/2005 | Lippey et al. | |
| 6,894,835 B2 | 5/2005 | Ohsako et al. | |
| 6,956,702 B2 | 10/2005 | Pate | |
| 6,969,177 B2 | 11/2005 | Li et al. | |
| 6,988,806 B2 | 1/2006 | Slobodin et al. | |
| 7,035,006 B2 | 4/2006 | Umeya et al. | |
| 7,035,015 B2 | 4/2006 | Teijido | |
| 7,040,764 B2 | 5/2006 | Przybyla et al. | |
| 7,090,357 B2 | 8/2006 | Magarill et al. | |
| 7,234,817 B2 | 6/2007 | Paukshto | |
| 2001/0011779 A1 | 8/2001 | Stover | |
| 2002/0015215 A1 | 2/2002 | Miles | |
| 2002/0024711 A1 | 2/2002 | Miles | |
| 2002/0043157 A1 | 4/2002 | Pillion et al. | |
| 2002/0044445 A1 | 4/2002 | Bohler et al. | |
| 2002/0063350 A1 | 5/2002 | Matsumoto | |
| 2002/0075555 A1 | 6/2002 | Miles | |
| 2002/0126354 A1 | 9/2002 | Jeong | |
| 2002/0130994 A1 | 9/2002 | Karman | |
| 2002/0145708 A1 | 10/2002 | Childers et al. | |
| 2002/0186349 A1 | 12/2002 | Wichner | |
| 2003/0002016 A1 | 1/2003 | Sellen et al. | |
| 2003/0043346 A1 | 3/2003 | Kwok et al. | |
| 2003/0128427 A1 | 7/2003 | Kalmanash et al. | |
| 2003/0128430 A1 * | 7/2003 | Leu et al. | 359/577 |
| 2003/0156326 A1 | 8/2003 | Lotz et al. | |
| 2003/0156328 A1 | 8/2003 | Go et al. | |
| 2003/0179346 A1 | 9/2003 | Mihara | |
| 2003/0214632 A1 | 11/2003 | Ma et al. | |
| 2004/0044445 A1 | 3/2004 | Bohler | |
| 2004/0061935 A1 | 4/2004 | Obsako | |
| 2004/0150883 A1 | 8/2004 | Shimoda et al. | |
| 2004/0196551 A1 | 10/2004 | Chubachi et al. | |
| 2004/0233524 A1 | 11/2004 | Lippey | |
| 2004/0240053 A1 | 12/2004 | Shimoda | |
| 2005/0030480 A1 | 2/2005 | Lippey | |
| 2005/0105176 A1 | 5/2005 | Lippey | |
| 2005/0207002 A1 * | 9/2005 | Liu et al. | 359/359 |
| 2005/0231800 A1 | 10/2005 | Lippey | |
| 2005/0241530 A1 | 11/2005 | Bruckner et al. | |

FOREIGN PATENT DOCUMENTS

| | | |
|---|---|---|
| DE | 19747597 | 8/1998 |
| DE | 19901970 | 8/2000 |
| EP | 0 442 738 A2 | 2/1991 |
| EP | 0 490 391 | 6/1992 |
| EP | 0 493 863 | 7/1992 |
| EP | 0 648 048 B1 | 10/1994 |
| EP | 0 609 593 B1 | 2/1995 |
| EP | 0 856 768 A | 5/1998 |
| EP | 0 657 769 B1 | 3/2000 |
| EP | 1324114 | 7/2003 |
| EP | 1341387 | 9/2003 |
| GB | 511 199 | 8/1939 |
| GB | 652 859 | 5/1951 |
| GB | 2388992 | 11/2003 |
| JP | 62178906 | 8/1987 |
| JP | H04-219745 | 8/1992 |
| JP | 05011344 A | 1/1993 |
| JP | 05216123 A | 8/1993 |
| JP | 6-082747 | 3/1994 |
| JP | H07-503348 | 7/1994 |
| JP | 6-289491 | 10/1994 |
| JP | 06289491 | 10/1994 |
| JP | H07-152088 | 6/1995 |
| JP | 07-270915 | 10/1995 |
| JP | 7261274 | 10/1995 |
| JP | 07270915 | 10/1995 |
| JP | 07 270 915 | 2/1996 |
| JP | 08186849 | 11/1996 |
| JP | H10-312027 | 11/1998 |
| JP | H11-174232 | 7/1999 |
| JP | H11-119002 | 8/1999 |
| JP | 2001-005412 | 1/2001 |
| JP | 2000-284908 | 2/2001 |

| | | |
|---|---|---|
| JP | 2001 055646 | 6/2001 |
| JP | 2001-264750 | 9/2001 |
| JP | 2001-305649 | 11/2001 |
| JP | 2003-50306 A | 2/2003 |
| JP | 2003-121637 A | 4/2003 |
| JP | 2003-337381 A | 11/2003 |
| JP | 2004-004821 | 1/2004 |
| JP | 2004-029163 A | 1/2004 |
| JP | 2004-029267 | 1/2004 |
| JP | 2004/038003 | 2/2004 |
| JP | 2004/61545 A | 2/2004 |
| JP | 2004-101558 A | 4/2004 |
| JP | 2004-117480 A | 4/2004 |
| JP | 2004-138938 A | 5/2004 |
| JP | 2004-144882 A | 5/2004 |
| JP | 2004-144883 A | 5/2004 |
| JP | 2004163806 A | 6/2004 |
| JP | 2004170959 | 6/2004 |
| WO | WO1993/15585 | 8/1993 |
| WO | WO 95/17690 | 6/1995 |
| WO | WO1997/01610 | 1/1997 |
| WO | WO 98/36320 A1 | 8/1998 |
| WO | WO 0041009 | 7/2000 |
| WO | WO 00/45220 | 8/2000 |
| WO | WO 00/57214 | 9/2000 |
| WO | WO2003/034145 | 4/2003 |
| WO | WO 03/050612 A1 | 6/2003 |
| WO | WO 03/077027 A1 | 9/2003 |
| WO | WO 03/077028 A1 | 9/2003 |
| WO | WO 2004/031852 A1 | 4/2004 |

OTHER PUBLICATIONS

Lotz, H. et al., "Thick Optical Multi-Layer Systems on PET Film," Precision, Nov. 2001, as printed from http://www.appliedfilms.com/Precision3/14_multilayer_systems/multilayer_systems_print.htm.
Extended European Search Report dated Nov. 7, 2007, issued in European Patent Application No. 07102106.7, filed Dec. 20, 2002.
European Partial Search Report dated May 18, 2007, issued in European Patent Application No. 07102106.7, filed Oct. 20, 2002.
Notification Concerning Transmittal of Copy of International Preliminary Report on Patentability (Chapter I of the Patent Cooperation Treaty), issued in corresponding Application No. PCT/US2006/000493, filed Jan. 6, 2006.
High Reflectors. Datasheet [online]. JK Consulting, 2003 [retrieved on Sep. 10, 2007]. Retrieved from the Internet: <URL:http://kruschwitx.com/HR's.htm>.
Young, L., Multilayer Interference Filters wit Narrow Stop Bands:. Applied Optics, vol. 6(2), pp. 297-312 (Feb. 1967).
Pelletier et al., "Interference Filters with Multiple Peaks", J. Opt. Soc. Am., vol. 72(6), pp. 683-687 (Jun. 1982).
EP Examination Report in Application No. 02102872.5, dated Oct. 18, 2004.
EP Examination Report in Application No. 02102872.5, dated May 13, 2005.
EP Examination Report in Application No. 05101098.1, dated Oct. 6, 2005.
EP Examination Report in Application No. 02102872.5, dated Mar. 17, 2006.
International Search Report in Application No. PCT/US2006/000493, dated Jun. 16, 2006.
EP Examination Report in Application No. 05101098.1, dated Feb. 16, 2007.
EP Search Report in Application No. 05101103.9, dated Mar. 2, 2007.
EP Partial Search Report in Application 07102106.7, dated May 18, 2007.
EP Search Report in Application 07102106.7, dated Nov. 7, 2007.
CN Office Action in Application No. 02157987.4, dated Jun. 8, 2007.
International Preliminary Report on Patentability in corresponding Application No. PCT/US2006/000493, dated Jul. 19, 2007.
IN Examination Report in Application No. 1064/MUM/2002, dated Apr. 10, 2008.
JP Examination Report in Application No. 2002-371849, dated Mar. 27, 2008.
Office Action in related Application No. 10/931,608, dated Aug. 25, 2005.
Office Action in related Application No. 10/931,608, dated Apr. 17, 2006.
Office Action in related Application NO. 11/033,214, dated Dec. 15, 2006.
Office Action in related Application No. 10/893,461, dated Jan. 5, 2007.
Office Action in related Application No. 11/548,373, dated Apr. 26, 2007.
Office Action in related Application No. 10/893,461, dated May 7, 2007.
Office Action in related Application No. 11/033,214, dated Sep. 13, 2007.
Office Action in related Application No. 11/127,531, dated Sep. 27, 2007.
Office ACtion in related Application No. 10/893,461, dated Feb. 15, 2008.
Office Action in related Application No. 11/548,373, dated Apr. 1, 2008.
Partial European Search Report dated Mar. 20, 2003 from European Application No. 02102872.5.
European Search Report dated May 30, 2003 from European Application No. 02102872.5.
Examination Report dated Mar. 1, 2004 from European Application No. 02102872.5.
European Search Report dated Jul. 17, 2007 from European Application No. 05101103.9.
Partial European Search Report dated Jun. 14, 2005 from European Application No. 05101098.1.
Examination Report dated May 19, 2008 from European Application No. 05101098.1.
Prosecution History of U.S. Appl. No. 10/028,063, retrieved from the internet on May 29, 2008.
Prosecution History of U.S. Appl. No. 10/931,608, retrieved from the internet on May 29, 2008.
Prosecution History of U.S. Appl. No. 11/033,214, retrieved from the internet on May 29, 2008.
Prosecution History of U.S. Appl. No. 11/548,373, retrieved from the internet on May 29, 2008.
Prosecution History of U.S. Appl. No. 10/893,461, retrieved from the internet on May 29, 2008.
Prosecution History of U.S. Appl. No. 11/127,531, retrieved from the internet on May 29, 2008.

* cited by examiner

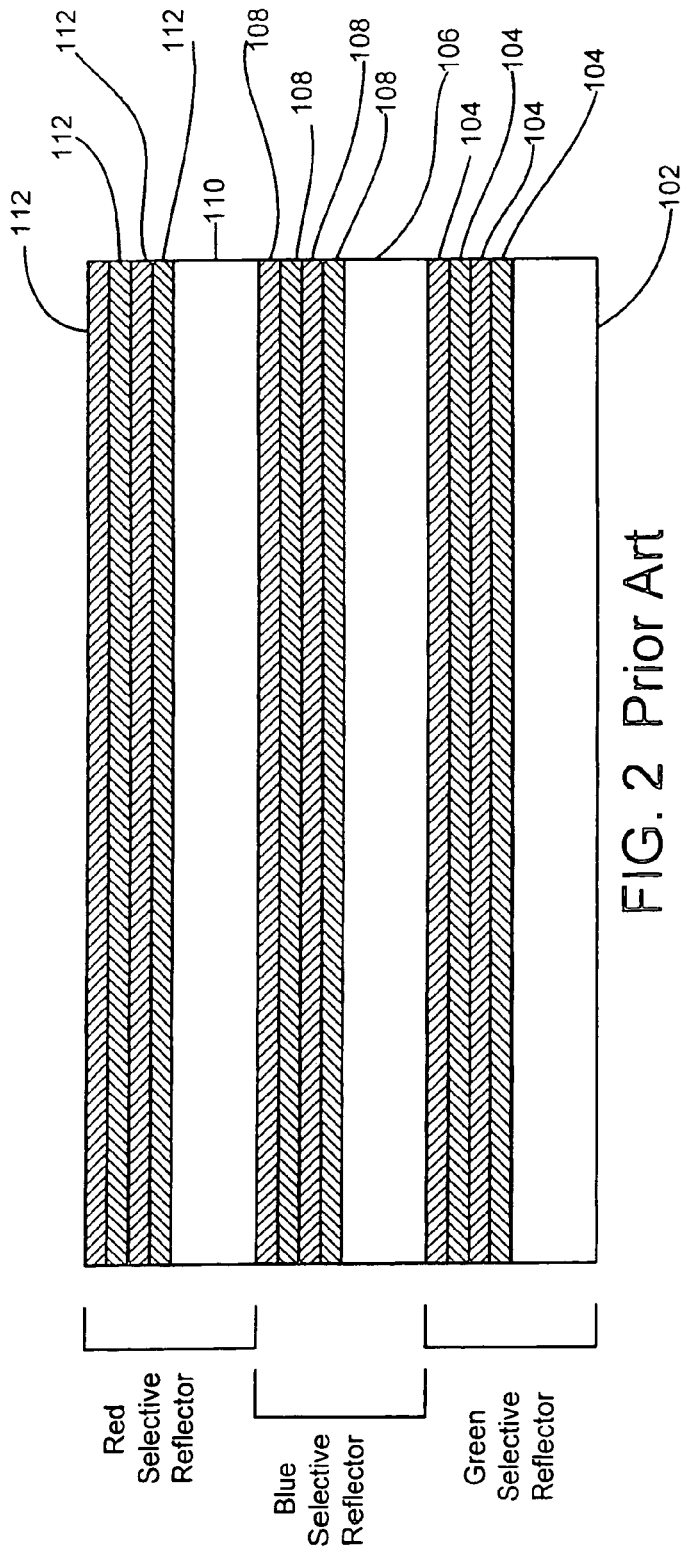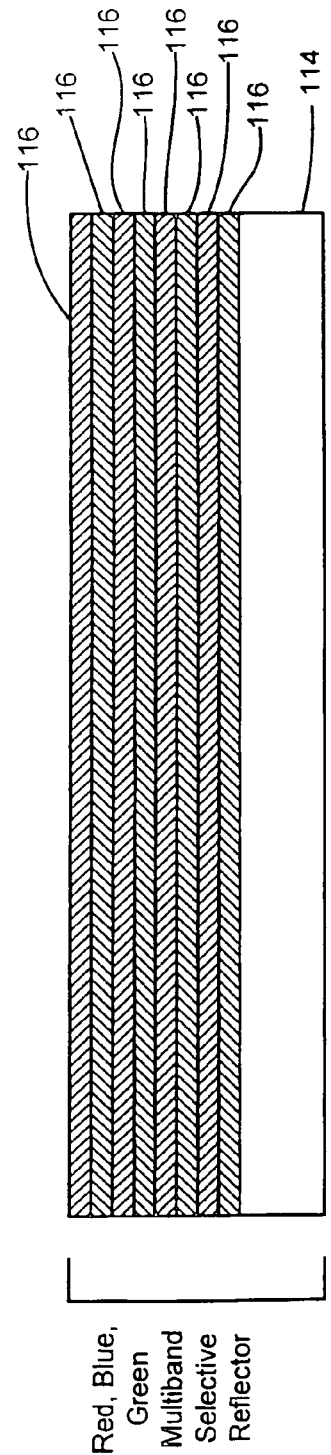

FIG. 4A

| Material | Thickness(nm) | Material | Thickness(nm) |
| --- | --- | --- | --- |
| Si | 600 | | |
| $SiO_2$ | 3.30 | $SiO_2$ | 23.91 |
| $Nb_2O_5$ | 3.30 | $Nb_2O_5$ | 23.91 |
| $SiO_2$ | 50.34 | $SiO_2$ | 100.00 |
| $Nb_2O_5$ | 50.34 | $Nb_2O_5$ | 100.00 |
| $SiO_2$ | 100.00 | $SiO_2$ | 26.48 |
| $Nb_2O_5$ | 100.00 | $Nb_2O_5$ | 26.48 |
| $SiO_2$ | 59.38 | $Nb_2O_5$ | 97.79 |
| $Nb_2O_5$ | 59.38 | $SiO_2$ | 97.79 |
| $SiO_2$ | 100.00 | $SiO_2$ | 100.00 |
| $Nb_2O_5$ | 100.00 | $Nb_2O_5$ | 100.00 |
| $SiO_2$ | 15.15 | $Nb_2O_5$ | 6.01 |
| $Nb_2O_5$ | 15.15 | $SiO_2$ | 6.01 |
| $SiO_2$ | 99.45 | $SiO_2$ | 35.12 |
| $Nb_2O_5$ | 99.45 | $Nb_2O_5$ | 35.12 |
| $SiO_2$ | 43.95 | $Nb_2O_5$ | 28.25 |
| $Nb_2O_5$ | 43.95 | $SiO_2$ | 28.25 |
| $SiO_2$ | 48.60 | $SiO_2$ | 19.65 |
| $Nb_2O_5$ | 48.60 | $Nb_2O_5$ | 19.65 |
| $SiO_2$ | 55.28 | $Nb_2O_5$ | 30.09 |
| $Nb_2O_5$ | 55.28 | $SiO_2$ | 30.09 |
| $SiO_2$ | 70.29 | $SiO_2$ | 4.27 |
| $Nb_2O_5$ | 70.29 | $Nb_2O_5$ | 4.27 |
| $SiO_2$ | 78.38 | $Nb_2O_5$ | 21.91 |
| $Nb_2O_5$ | 78.38 | $SiO_2$ | 21.91 |

FIG. 4B

| Material | Thickness (nm) |
|---|---|
| $SiO_2$ | 118.12 |
| $Nb_2O_5$ | 97.99 |
| $SiO_2$ | 144.36 |
| $Nb_2O_5$ | 63.14 |
| $SiO_2$ | 159.07 |
| $Nb_2O_5$ | 92.24 |
| $SiO_2$ | 68.79 |
| $Nb_2O_5$ | 47.51 |
| $SiO_2$ | 74.24 |
| $Nb_2O_5$ | 62.77 |
| $SiO_2$ | 158.03 |
| $Nb_2O_5$ | 97.99 |
| $SiO_2$ | 257.58 |
| $Nb_2O_5$ | 131.25 |
| $SiO_2$ | 99.71 |
| $Nb_2O_5$ | 65.78 |

FIG. 7

| Material | Thickness (nm) | |
|---|---|---|
| Al | 50.0 nm | Reflective Layer 1 |
| $SiO_2$ | 86.7 nm | |
| $TiO_2$ | 109.0 nm | |
| $SiO_2$ | 122.8 nm | |
| $TiO_2$ | 49.1 nm | |
| $SiO_2$ | 145.5 nm | |
| $TiO_2$ | 90.0 nm | |
| $SiO_2$ | 131.5 nm | |
| $TiO_2$ | 26.8 nm | |
| Ti | 13.3 nm | Reflective Layer 2 |
| $SiO_2$ | 94.7 nm | Optional Protective Layer |

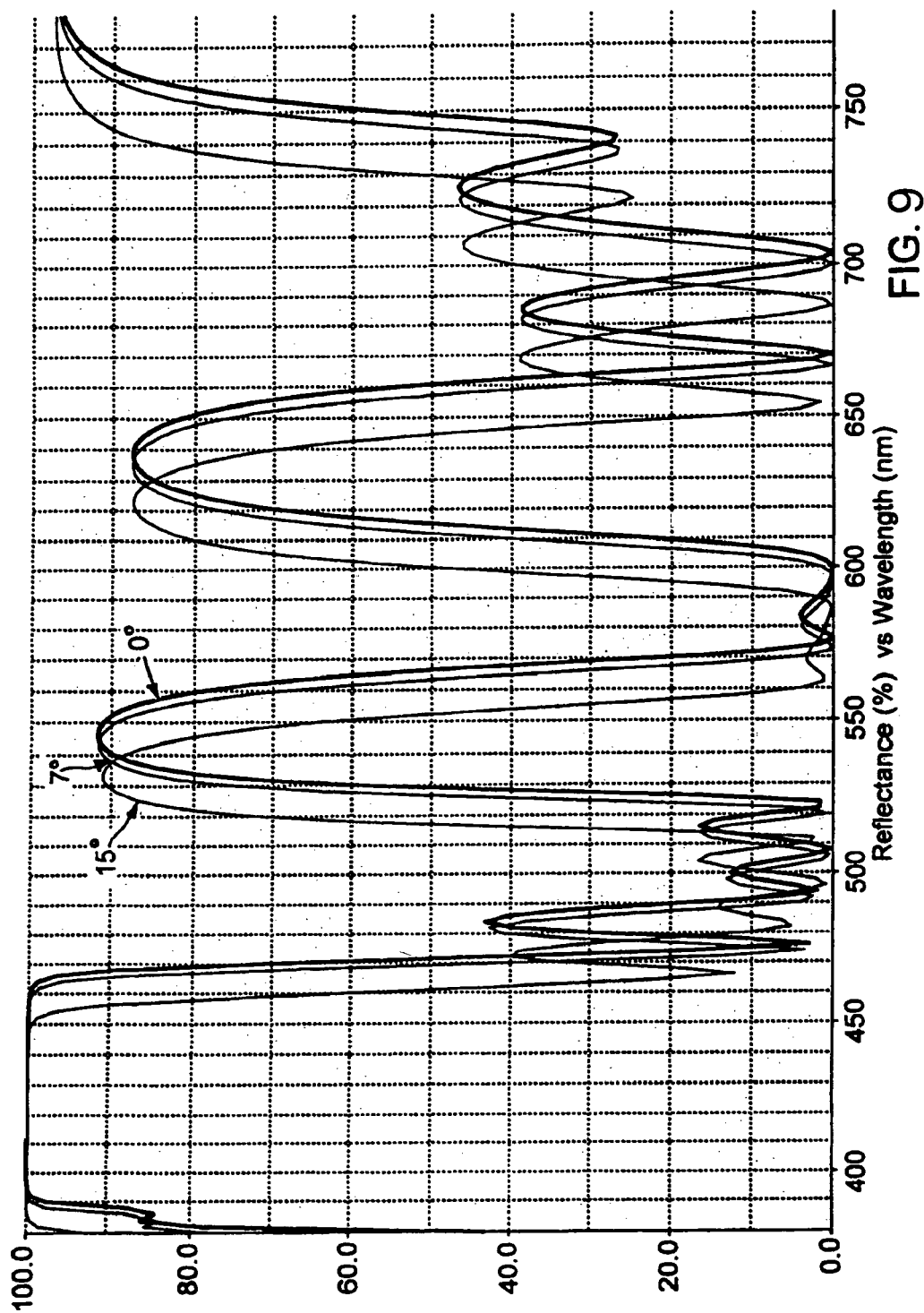

Front View of Entire Screen

Side View of One Lens Set

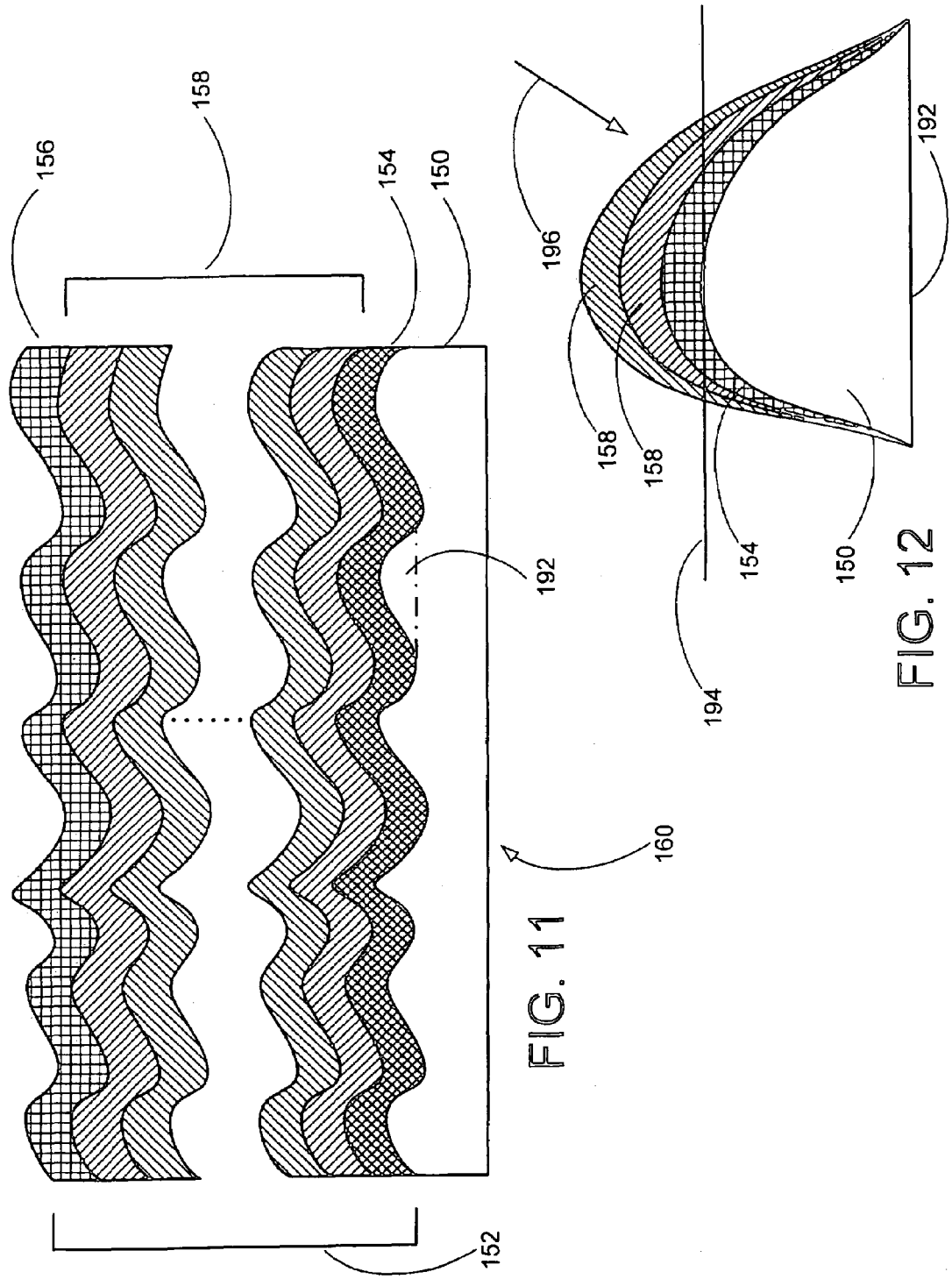

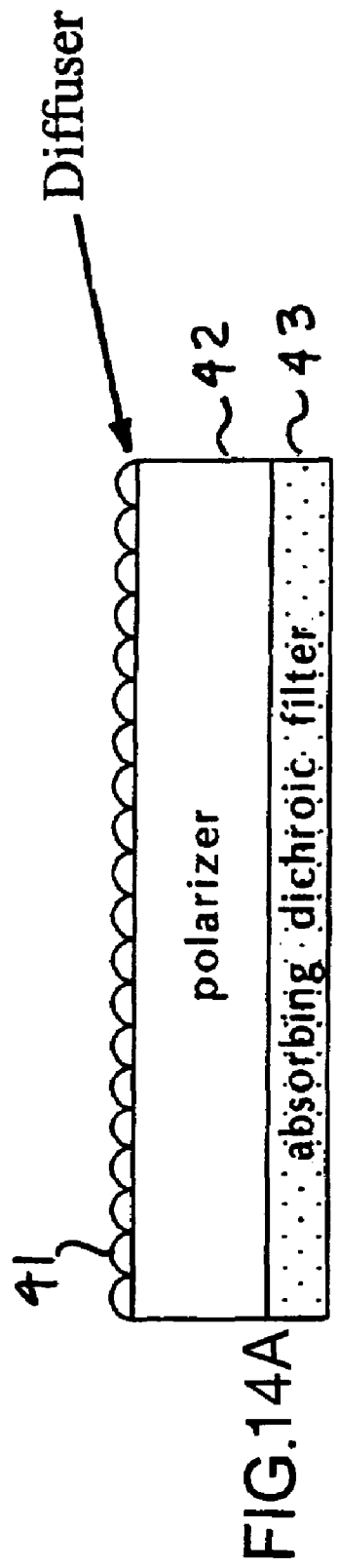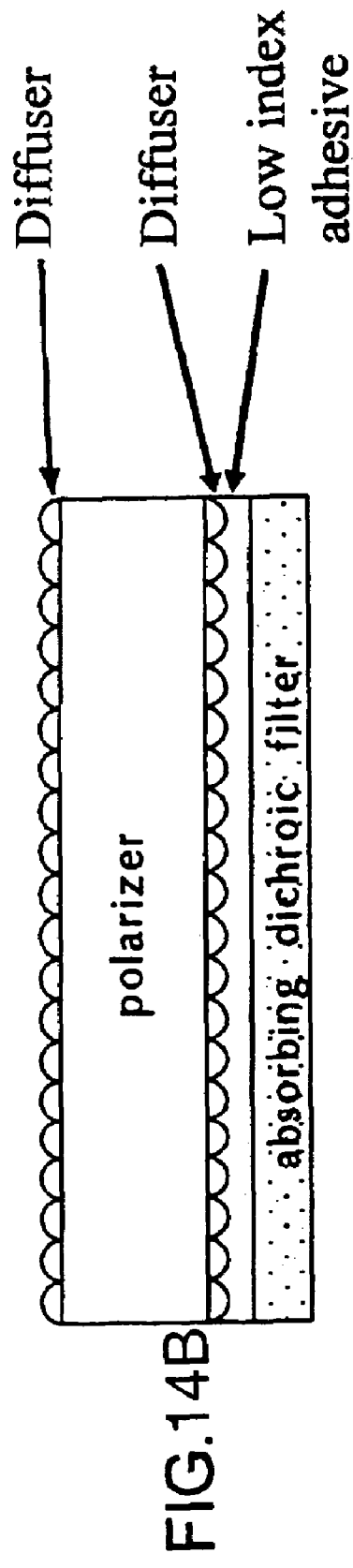
FIG.14A a. Front surface diffuser only
FIG.14B b. Front surface diffuser and immersed diffuser 1= projector on white screen
2= filtered projector on white screen
3= filtered projector on new screen

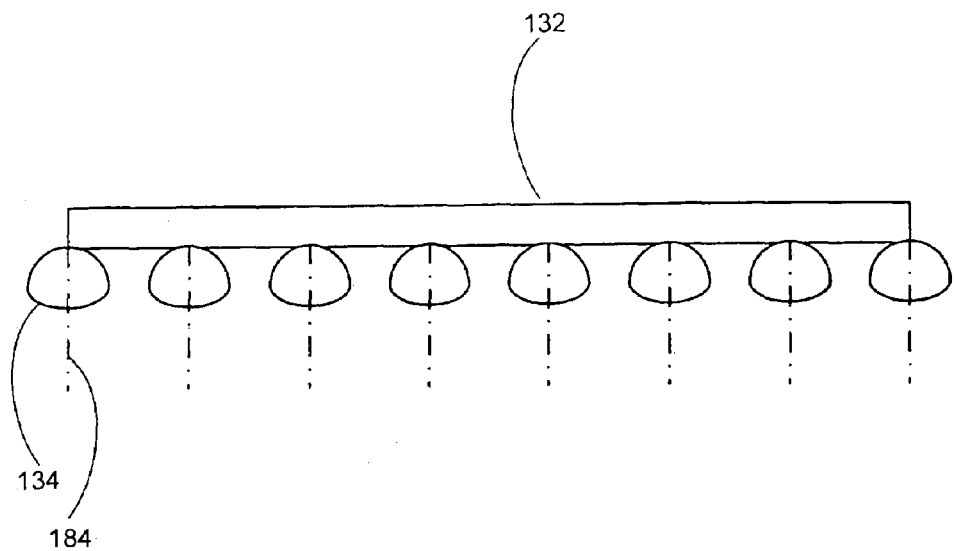
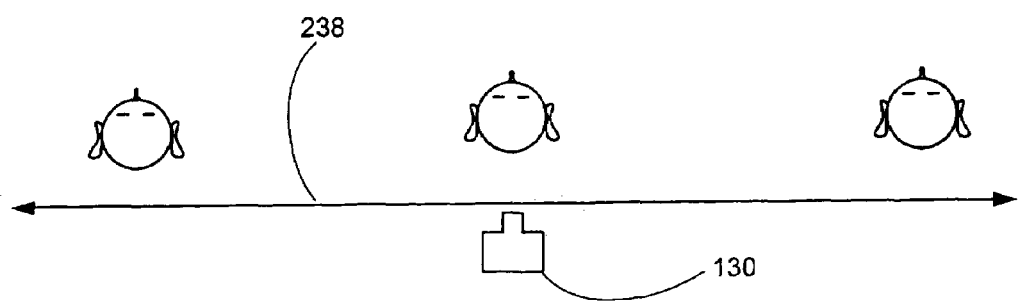
FIG. 22

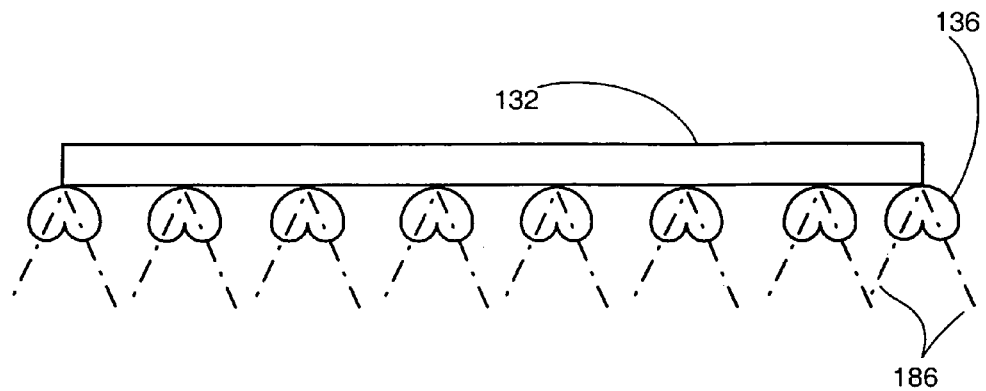
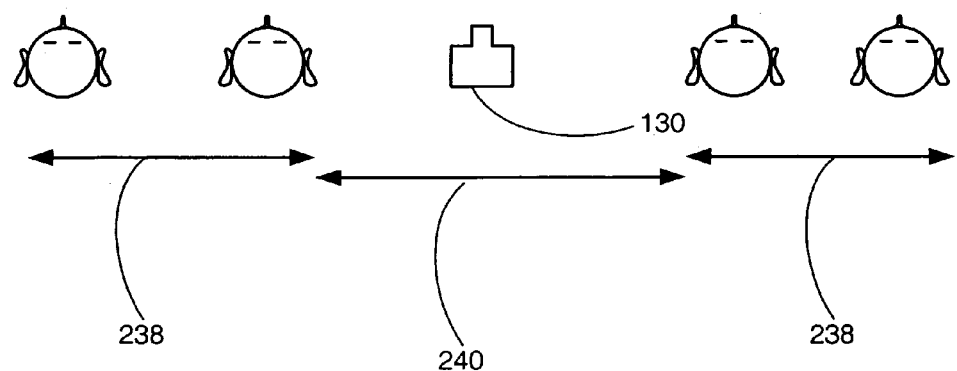
FIG. 23A

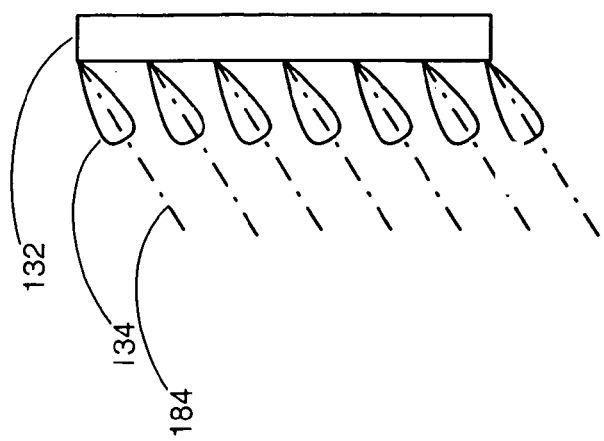
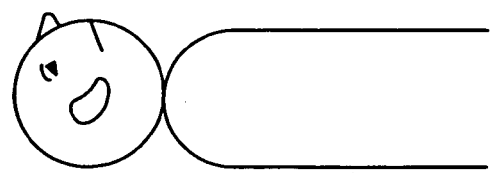
FIG. 23B

SELECTIVE REFLECTING

CLAIM OF PRIORITY

This is a continuation in part of U.S. patent application Ser. No. 10/028,063, filed Dec. 21, 2001, now U.S. Pat. No. 6,847,483 the entire contents of which are hereby incorporated by reference.

The present invention relates in general to selective reflecting and more particularly concerns selective reflecting for front-projection display systems, such as used in home cinema or business applications.

BACKGROUND OF THE INVENTION

For background, reference is made to U.S. Pat. Nos. 5,335,022 and 5,148,309, which relate to polarized screens. One prior art method of increasing contrast ratio is to put neutral density absorption into the screen and appropriately increase the light output from the projector to compensate.

SUMMARY OF THE INVENTION

A method for making a projection screen, includes depositing onto a diffusing substrate having a contour layers of high index-of-refraction (n) dielectric material and low n material so that the layers generally follow the contour of the diffusing substrate to provide a diffusing multilayer interference structure; depositing, on another substrate, a polarizing coating to provide a polarizer for transmitting light with one linear polarization and for absorbing light with a second linear polarization; applying, on at least one of the diffusing multilayer interference structure or a matte diffuser, a first layer of uncured adhesive; curing the first layer of uncured adhesive to provide a first layer of cured adhesive; applying, on at least one of the polarizer and the matte diffuser, a second layer of uncured adhesive; curing the second layer of uncured adhesive to provide a second layer of cured adhesive; and laminating the diffusing multilayer interference structure, the matte diffuser, the polarizer, and a front diffuser, the front diffuser characterized by a diffusion pattern in which lobes are non-perpendicular to the front diffuser. Depositing the layers may further include prior to depositing the alternating layers of high n and low n dielectric material, depositing onto the diffusing substrate a first reflective layer, and subsequent to the depositing the alternating layers of high n and low n dielectric material, depositing onto the alternating layers a second reflective layer.

An optical device, includes a first reflective layer, a second reflective layer, and substantially continuous layers of dielectric material. Each layer consists essentially of a material having a different index-of-refraction (n) than the material of an adjacent layer. The layers are disposed between the first reflective layer and the second reflective layer, and are constructed and arranged so that an optical output of the optical device includes substantially more light with wavelengths in a plurality of narrow wavelength bands than light with wavelengths not in the plurality of wavelength bands.

The first reflective layer maybe highly reflective so that the optical output is reflected light with wavelengths in the plurality of narrow wavelength bands. The first reflective layer may comprise aluminum.

The first reflective layer may be partially reflective so that the optical output comprises transmitted light with wavelengths in the plurality of narrow wavelength bands.

The first reflective layer comprises a substrate comprising a reflective material.

The first reflective layer may include a diffuser.

The first reflective layer may include aluminum.

The first reflective layer may include a diffuser.

The device may have a width and height that are greater than seven inches.

A diffusing optical device includes a light diffusing substrate with an irregular surface. Layers of dielectric material disposed on the substrate. The layers generally follow the contour of the irregular surface of the diffusing substrate so that the surfaces of the layers are irregular.

Each layer may consist essentially of a material having a different index-of-refraction (n) than the material of an adjacent layer. The device may be constructed and arranged so that the reflectance of light with a wavelength in a narrow wavelength band is significantly greater than the reflectance of light with wavelengths not in the wavelength band.

The device may include a first reflective layer and a second reflective layer, positioned so that the layers of dielectric material are between the first reflecting layer and the second reflecting layer and so that the first reflecting layer is between the dielectric layers and the substrate. The first reflective layer and the second reflective layer follow the contour of the irregular surface of the diffusing substrate so that the surfaces of the reflective layers are irregular.

The diffusing substrate may be reflective.

The device may further include a reflective layer, disposed on the layers of dielectric material so that the surface of the reflective layer is irregular.

The surface of the substrate may have irregularities with amplitudes in the range of 1-5 micrometers and periods in the range of 10-50 micrometers.

The layers may be constructed and arranged so that the reflectance of light with wavelengths plurality of wavelength bands is significantly greater than the reflectance of light with wavelengths not in the plurality of the wavelength bands An optical device includes a first irregular, diffusing, reflective surface and a second reflective surface, separated from the irregular diffusing surface by a gap. The irregular diffusing reflective surface, the second reflective surface, and the gap are constructed and arranged so that the reflectance of light with wavelengths in a narrow wavelength band is significantly greater than the reflectance of light with wavelengths not in the wavelength band.

The optical device may further include layers of dielectric material, each layer consisting essentially of a material having a different index-of-refraction (n) than the material of an adjacent layer. The layers may generally follow a contour of the irregular surface of the diffusing substrate so that the surfaces of the layers are irregular. The irregular diffusing reflective surface, the second reflective surface, and the layers of dielectric material may be constructed and arranged so that the reflectance of light with wavelengths in a narrow wavelength band is significantly greater than the reflectance of light with wavelengths not in the wavelength band.

The irregular diffusing reflecting surface may be the surface of a metal substrate.

The metal substrate may include aluminum.

The irregular diffusing reflecting substrate may include a thin reflective coating.

A projection system includes a multi-layer projection screen. The projection screen includes a polarizing coating in the range of 1 to 10 micrometers thick, deposited on a substrate. The coating is constructed and arranged to selectively absorb light of one polarization and to transmit light of other polarizations.

The projection system may further include a projector that is constructed and arranged to polarize light with wavelengths in a plurality of narrow wavelength bands into the one polarization.

The projection screen may include layers of dielectric material, each layer consisting essentially of a material having a different index-of-refraction (n) than the material of an adjacent layer. The layers may be deposited on a substrate. The layers dielectric material are constructed and arranged so that the reflectance of light with wavelengths in the plurality of narrow wavelength bands is substantially greater than the reflectance of light with wavelengths not in the plurality of wavelength bands.

The substrate may be a diffusing substrate.

The projection screen may further include a first reflective layer and a second reflective layer, wherein the layers of dielectric material are positioned between the first reflective layer and the second reflective layer and wherein the first and second reflective layer and the layers of dielectric material are constructed and arranged so that the reflectance of light with wavelengths plurality of pre-determined narrow non-harmonic wavelength bands is substantially greater than the reflectance of light with wavelengths not in the plurality of wavelength bands and so that light with wavelengths not in the plurality of wavelength bands destructively interferes The dielectric layers may be constructed and arranged to transmit the light with wavelengths not in the plurality of wavelength bands. The projection screen may further include an absorbing layer for absorbing light with wavelengths not in the plurality of wavelength bands.

The first polarization and the second polarization may be linear polarizations.

A projection screen is constructed and arranged so that the reflectance of light with wavelengths in a plurality of pre-determined narrow non-harmonic wavelength bands is substantially greater than the reflectance of light with wavelengths not in the plurality of wavelength bands. The projection screen includes a selective reflecting device. The selective reflecting device includes a substrate and a stack of consecutive layers of dielectric material. Each layer consists essentially of a material having a different index-of-refraction (n) than the material of an adjacent layer. The layers are disposed on the substrate and are constructed and arranged so that the reflectance of light with wavelengths plurality of narrow non-harmonic wavelength bands is substantially greater than the reflectance of light with wavelengths not in the plurality of wavelength bands.

The projection screen may further include a polarizer, for transmitting light with wavelengths that is polarized in one polarization and for absorbing light that is not polarized in the one polarization.

The layers may constructed and arranged to transmit light that is not reflected. The projection screen may further include an absorbing layer to absorb the light that is transmitted.

The selective reflecting device may further include a first reflective layer and a second reflective layer. The layers of dielectric material may be disposed between the first reflective layer and the second reflective layer. The selective reflecting device is constructed and arranged to cause the light with wavelengths outside the plurality of narrow wavelength bands to destructively interfere.

The projection screen may further include a polarizer for transmitting light with wavelengths that is polarized in one polarization and that is within the narrow wavelength bands and to absorb light with wavelengths that is not within the narrow wavelength bands.

The projection screen may further include a front diffuser. The front diffuser is constructed and arranged to diffuse asymmetrically in the X and Y directions.

The projection screen may further include a polarizer, for transmitting light with wavelengths that is polarized in one polarization and for absorbing light that is not polarized in the one polarization.

The projection screen may further include a polarizer constructed and arranged to transmit light of one polarization and to absorb light of other polarizations.

The projection screen may further include a front diffuser. The front diffuser may be constructed and arranged to diffuse asymmetrically in the X and Y directions.

The projection screen may further include an optical device constructed and arranged to cause the projection screen to have a light reflection pattern that is characterized by a lobe with an axis that is not perpendicular to the plane of the projection screen.

The projection screen may further include a front diffuser. The front diffuser may be constructed and arranged to diffuse asymmetrically in the X and Y directions.

The projection screen may further include an optical device constructed and arranged to cause the projection screen to have a light reflection pattern that is characterized by a lobe with an axis that is not perpendicular to the plane of the projection screen.

The optical device may be constructed and arranged to cause the projection screen to have a light reflection pattern that is characterized by two lobes.

The optical device may be constructed and arranged to cause the projection screen to have a light reflection pattern that has a lobe that has an axis that is slanted up, down, left, or right relative to the plane of the screen.

A multi-layer projection screen includes a selective reflecting device for selectively reflecting light so that the reflectance of light with wavelengths in a pre-determined non-harmonic plurality of wavelength bands is substantially greater than light with wavelengths not in the pre-determined non-harmonic plurality of wavelength bands; and a matte surfaced diffuser for diffusing the light with the wavelengths in the pre-determined plurality of wavelength bands.

The matte surfaced diffuser may include a substrate and a matte surfaced diffusing coating.

The matte surfaced diffuser may be positioned between the selective reflecting device and a polarizer.

The matte surfaced diffuser may be a substrate for a selective reflecting device that may include layers of dielectric material, each layer consisting essentially of a material having a different index-of-refraction (n) than the material of an adjacent layer.

The matte surfaced diffuser may be a substrate for the dielectric layers and wherein the projection screen further includes a first reflecting layer disposed on another substrate. The dielectric layers may be disposed on the first reflecting layer. A second reflecting layer may be disposed on the dielectric layers.

A method for manufacturing a multi-layer projection screen includes applying uncured adhesive to a first layer of the projection screen; curing the adhesive; and laminating a second layer of the projection screen to the first layer.

Applying the uncured adhesive to the one layer may include applying the adhesive to a selective reflector. The selective reflector may be constructed and arranged so that the reflectance of light with wavelengths in a plurality of narrow wavelength bands is significantly greater than the reflectance of light with wavelengths not in the plurality of narrow wavelength bands.

Applying the uncured adhesive to the selective reflector may include applying the uncured adhesive to a multilayer interference filter.

Applying the uncured adhesive to the selective reflector may include applying the uncured adhesive to an etalon device.

The laminating the second layer may include laminating a polarizer.

Applying the second layer may include depositing a polarizing coating to a substrate.

The method for manufacturing a projection screen may further include applying a second layer of uncured adhesive to the second layer of the projection screen and curing the second layer of adhesive.

A projection screen may include an optical device constructed and arranged to cause the projection screen to have a light reflectance pattern that is characterized by a lobe with an axis that is not perpendicular to the plane of the projection screen.

The optical device may be constructed and arranged to cause the projection screen to have a light reflectance pattern that is characterized by two lobes.

The optical device may be constructed and arranged to cause the projection screen to have a light reflectance pattern that has a lobe that has an axis that is slanted up, down, left, or right relative to the plane of the screen.

A projection screen is constructed and arranged to receive input light at a location on the screen. The input light is received at an angle relative to a surface of the screen at the location. The projection screen may be further constructed and arranged to reflect light from the location along an array of output directions that may be distributed about an output is. The output axis may be at an angle relative to the surface that is different from the angle than would have resulted if the surface were a simple plane reflector.

The input angle may be normal and the output angle may be other than normal.

The input angle may be non-normal and the output angle may be normal.

A method for making projection screen includes depositing onto a first substrate layers of dielectric material. Each layer may consist essentially of a material having a different index-of-refraction (n) than the material of an adjacent layer. The method may further include depositing onto the layers of dielectric material a first reflective layer.

The method for making a projection screen may further include the step of: prior to the depositing onto the first substrate the layers of dielectric material, depositing onto the first substrate a second reflective layer. The depositing onto the first substrate may include depositing onto the second reflective layer the layers of dielectric material.

The depositing onto the first substrate layers dielectric material may include depositing the layers of dielectric material onto a substrate with a reflective surface.

The depositing onto the first substrate layers of dielectric material may include depositing the layers onto a diffusing substrate.

The method for making a projection screen may further include the step of: prior to the depositing onto the first substrate the layers dielectric material, depositing onto the substrate a second reflective layer. The depositing onto the first substrate may include depositing onto the second reflective layer the layers of dielectric material.

The depositing onto the first substrate layers of dielectric material may include depositing the layers onto a substrate with a reflective surface.

The laminating step may include applying an adhesive in an uncured state to the diffusing layer and curing the adhesive.

The laminating step may include applying an adhesive in an uncured state to the diffusing layer, and curing the adhesive.

The method for making a projection screen may further include depositing onto one surface of a second substrate a polarizing layer; depositing onto another surface of the second substrate a diffusing layer; and laminating the polarizing layer to the reflective layer.

A method may include at a projection screen receiving projected light and ambient light, processing the light, and preferentially reflecting portions of the light that may be within at least two narrow spectral bands relative to reflection of light that may be not within the narrow spectral bands. The processing occurs within consecutive alternating layers of higher and lower index-of-refraction materials.

The processing the light may include reflecting the light, by a first and second reflective layer constructed and arranged so that the alternating layers of higher and lower index of refraction materials may be between the first and the second reflected layer, so that light with wavelengths not in the plurality of narrow bands of wavelengths destructively interferes.

The method may further include polarizing, by a projector, so that the projected light has substantially more light of one linear polarization than of another linear polarization and polarizing, by the screen, of the projected light and the ambient light so that the screen substantially reflects light of the one linear polarization and absorbs light of the second linear polarization.

The method may further include projecting the light by a projector that may be constructed and arranged to project substantially more light with wavelengths in the plurality of narrow bands of wavelengths than light with wavelengths not in the plurality of narrow bands.

The details of one or more embodiments of the invention are set forth in the accompanying drawings and the description below. Other features, objects, and advantages of the invention will be apparent from the description and drawings, and from the claims.

BRIEF DESCRIPTION OF THE SEVERAL VIEWS OF THE DRAWING

FIG. 2 is a prior art structure of three multilayer interference filters;

FIG. 3 is a single stack, multilayer, multiband interference filter;

FIGS. 4A AND 4B are tables of exemplary multilayer coatings;

FIG. 7 is a table of an exemplary multilayer, multiband etalon structure;

FIG. 9 is a graphical representation of the effect of viewing angle on the reflectance of a multilayer multiband non-etalon coating;

FIG. 11 is a cross sectional view through a diffusing multilayer multiband structure;

FIG. 12 is a cross sectional view through a portion of the structure of FIG. 11;

FIG. 14A is a sectional view through an exemplary projection screen according to the invention having a simplified construction;

FIG. 14B is a sectional view through an exemplary projection screen according to the invention having both front surface and immersed diffusers;

FIG. 22 is an example of a typical viewing pattern; and

FIGS. 23A-23C are examples of alternate viewing patterns.

DETAILED DESCRIPTION

Figure 1:
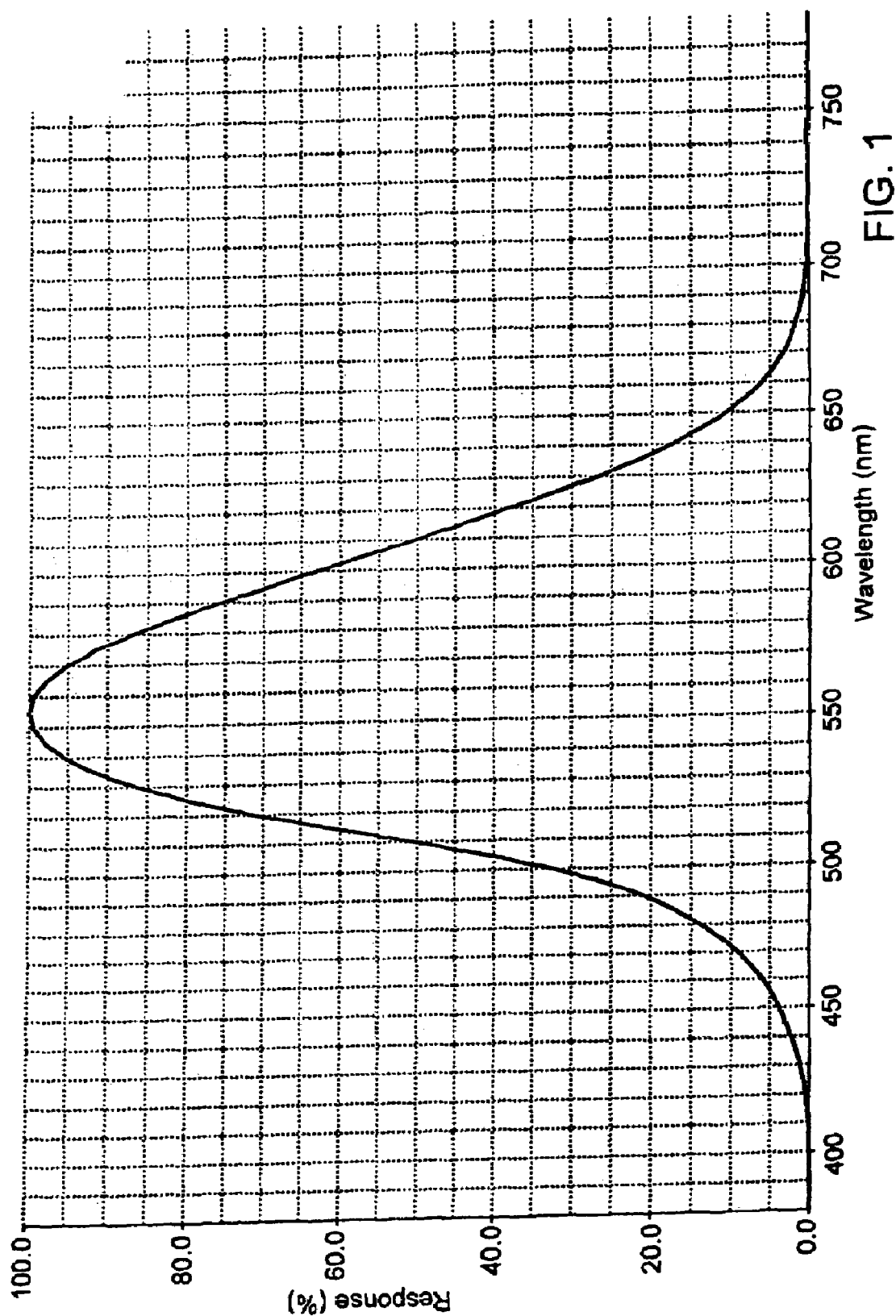
FIG. 1 is a graphical representation of the sensitivity of the human eye to optical energy as a function of wavelength.

The cross-sectional views of the drawing are not drawn to scale. The actual dimensions are as stated in the specification and figures. The cross-sectional views are intended to shown the order of the layers of multilayer devices. The representations of the layers of the multilayer devices are schematic and may not represent the actual profiles of the materials. The asymmetric diffusers are described in the specification and may not have profiles that are as regular as represented in the figures.

With reference now to the drawing, and more particularly FIG. 1, there is shown a graphical representation of the sensitivity of the human eye as a function of optical wavelength, extending from blue at shorter wavelengths to red at longer wavelengths and peaking at green in the center.

Referring to FIG. 2, there is shown a prior art selective reflector including three multilayer, single band, reflecting interference filters. Multilayer interference filters (MLIs) typically include layers of dielectric materials, each layer of a material with a different index of refraction (n) than the material of the adjacent layer or layers of dielectric material. It is usually advantageous to maximize the difference in n between adjacent layers, so it is typical to use alternating layers of high n materials (such as $TiO_2$, $Nb_2O_5$, or $Ta_2O_5$) and low n materials (such as $SiO_2$) in adjacent layers. It is also possible to use materials with medium n (such as $Al_2O_3$), or to use two materials having a high n (or two materials having a low n) in adjacent layers. Further information on multilayer interference filters can be found in *Thin Film Optical Filters* by H. A. MacLeod, ISBN 0750306882.

In the device of FIG. 2, a multilayer interference (MLI) filter for reflecting light with wavelengths in the green spectral band includes a substrate 102 and a "stack" including a plurality 104 of layers of dielectric materials, each layer of a material with a different index of refraction (n) than the material of the adjacent layer or layers of dielectric material. An MLI for reflecting light with wavelengths in the blue spectral band includes a substrate 106 and a stack including a plurality 108 of layers of dielectric materials, each layer of a material with a different index of refraction (n) than the material of the adjacent layer or layers of dielectric material. An MLI for reflecting light with wavelengths in the red spectral band includes a substrate 110 and a stack including a plurality 112 of layers of dielectric materials, each layer of a material with a different index of refraction (n) than the material of the adjacent layer or layers of dielectric material. The substrates 102, 106, and 108 should be thicker than the coherence length of the light to avoid interference effects between the red, green, and blue filters. A typical coherence length for UHP-based projector light is on the order of a few microns.

Referring to FIG. 3, there is shown a single stack, multilayer, multiband selective reflector. The single stack, multilayer, multiband selective reflector includes a single substrate 114. A substrate is a base material used to deposit thin layers on and to provide structural support for the thin layers. A typical substrate is smooth polyethelene terephthalate (PET) film 1 to 10 mils thick, although other types of substrates such as matte substrates and metal substrates will be included in some of the figures below. The single stack, multilayer, multiband selective reflector further includes a single stack including layers 116 of dielectric materials, each layer of a material with a different index of refraction (n) than the material of the adjacent layer or layers of dielectric material. The selective reflector reflects light in multiple spectral bands, in this case red, blue, and green. The layers 116 of the selective reflector that reflect light in multiple spectral bands are consecutive, that is, there are no intervening components, such as substrates, that are not one of the layers of dielectric material.

Referring to FIGS. 4A AND 4B, there are shown tables illustrating examples of typical multilayer coatings having a plurality of layers (some layers consisting of 2 sub-layers) of the indicated materials and indicated thicknesses. In FIGS. 4A and 4B, the layers are listed in the order of deposition by column. So, for example, in FIG. 4A, an Si layer 600 nm thick is the first layer deposited and is therefore the bottom layer; an $SiO_2$ layer 21.91 nm thick is the last layer deposited and is therefore is the top layer; and the $Nb_2O_5$ layer 78.38 nm thick is deposited immediately before the $SiO_2$ layer 23.91 nm thick. Other combination of materials and layers that selectively reflect light with wavelengths in narrow bands can be found by using software available from Software Spectra Inc., Internet address www.tfcalc.com.

The coatings in the tables of FIGS. 4A AND 4B are constructed and arranged so that reflectance of light in three spaced narrow bands (such as the red, green, and blue bands) of optical energy is significantly greater than the reflectance of other visible wavelengths. Reflection is typically greater than 90 percent average from 450 to 490 nm, greater than 75 percent average from 540 to 570 nm, and greater than 80 percent average from 610 to 650 nm at zero degrees angle of incidence (AOI). Reflection is typically less than 10 percent average from 500 to 530 nm, less than 20 percent average from 500 to 530 nm and less than 20 percent average from 580 to 600 nm at zero degrees AOI. Reflection is typically less than 50 percent average from 660 to 780 nm at zero degrees AOI.

Figure 5A:
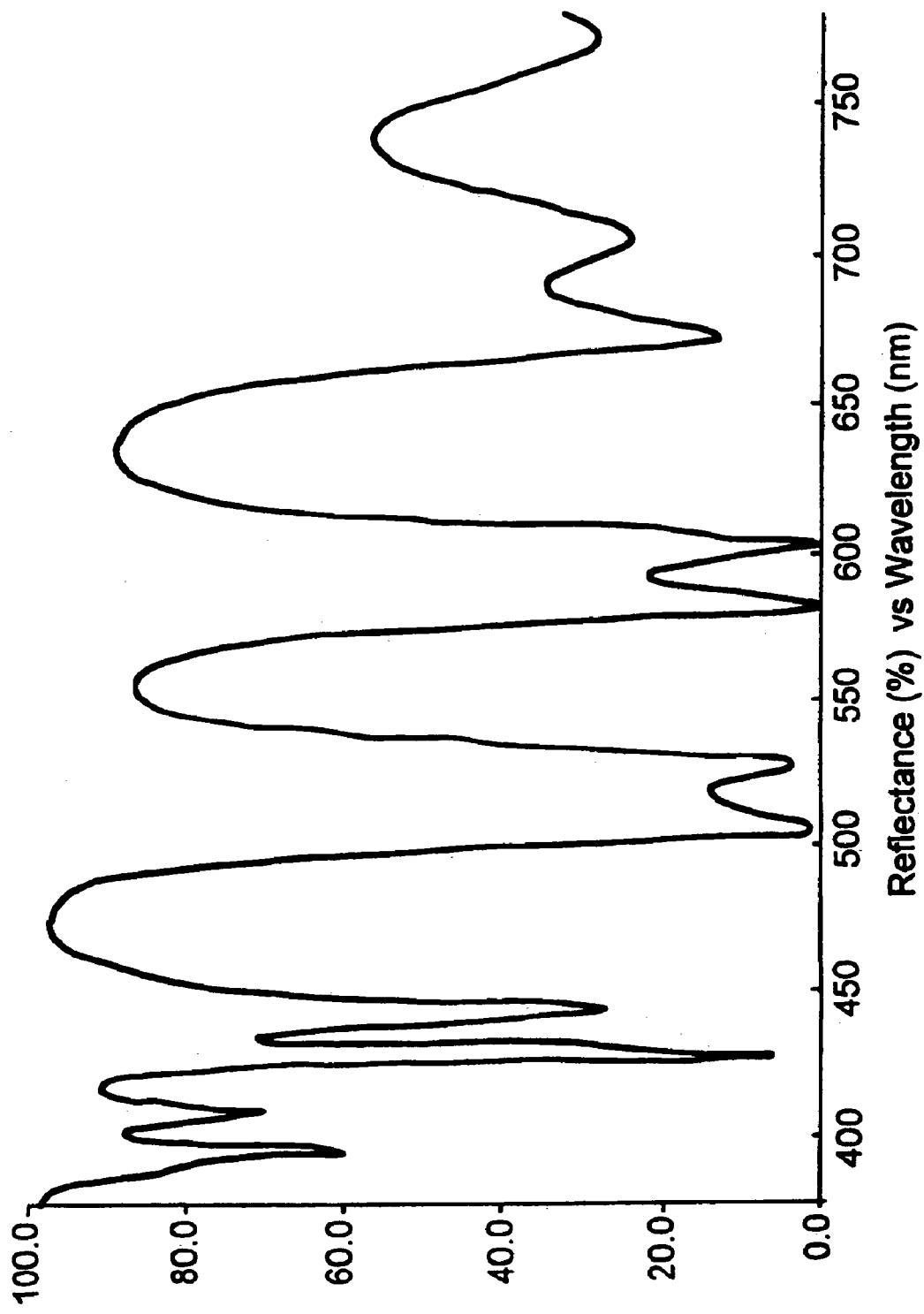
FIGS. 5A and 5B are graphical representations of reflectance as a function of wavelength for two exemplary multilayer coatings.
Figure 5B:
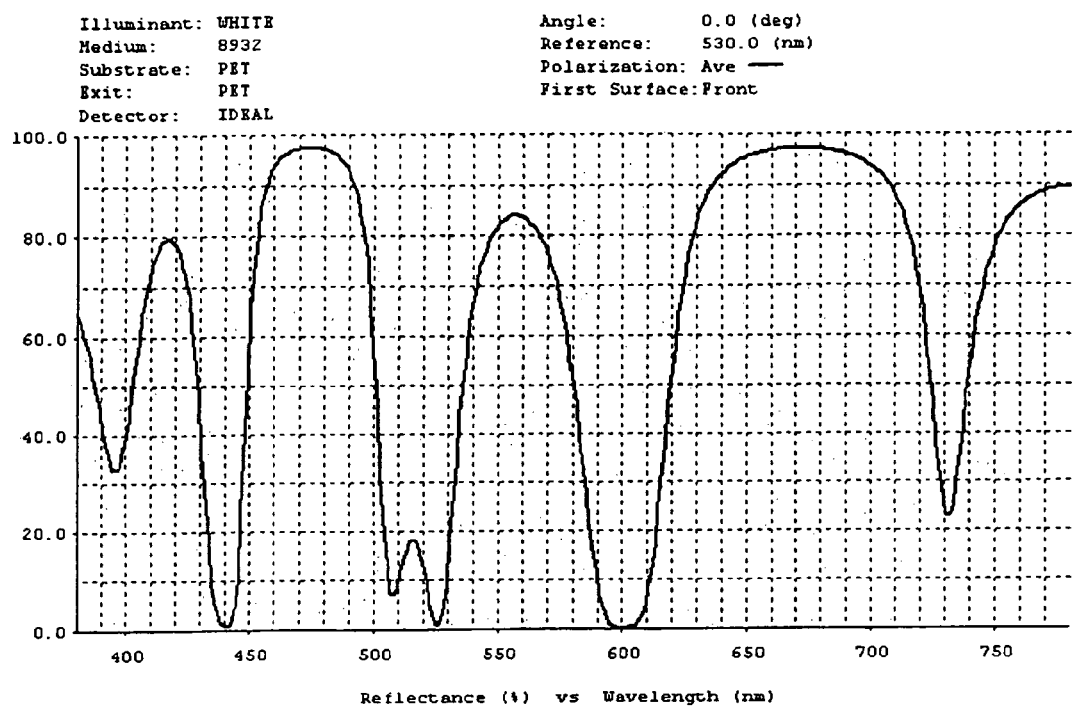

Referring to FIGS. 5A and 5B, there are shown, respectively, graphical representations of the spectral performance of the coating designs shown in FIGS. 4A and 4B.

Another type of a single stack, multiband, multilayer selective reflector can be made using an etalon, or Fabry-Perot device. In a conventional etalon, two parallel reflecting mirrors are separated by a gap, typically filled with a medium such as air or gas, with length d. If both mirrors are partially reflective, light with wavelength $$\lambda = \frac{2d}{m}$$

(where m is an integer) is transmitted with minimal loss and light of other wavelengths destructively interferes. If the mirror on the light incident side is partially reflective and the mirror on the non-light incident side is highly reflective, light with wavelength $$\lambda = \frac{2d}{m}$$

is reflected with minimal loss and light of other wavelengths destructively interferes in the etalon.

Further information about Fabry-Perot devices can be found at Internet address
http://physics.usask.ca/~angie/ep421/lab3/theory.htm
a printout of which is attached as Appendix A. Since m is an integer, the wavelengths that are selectively reflected are harmonics.

Figure 6:
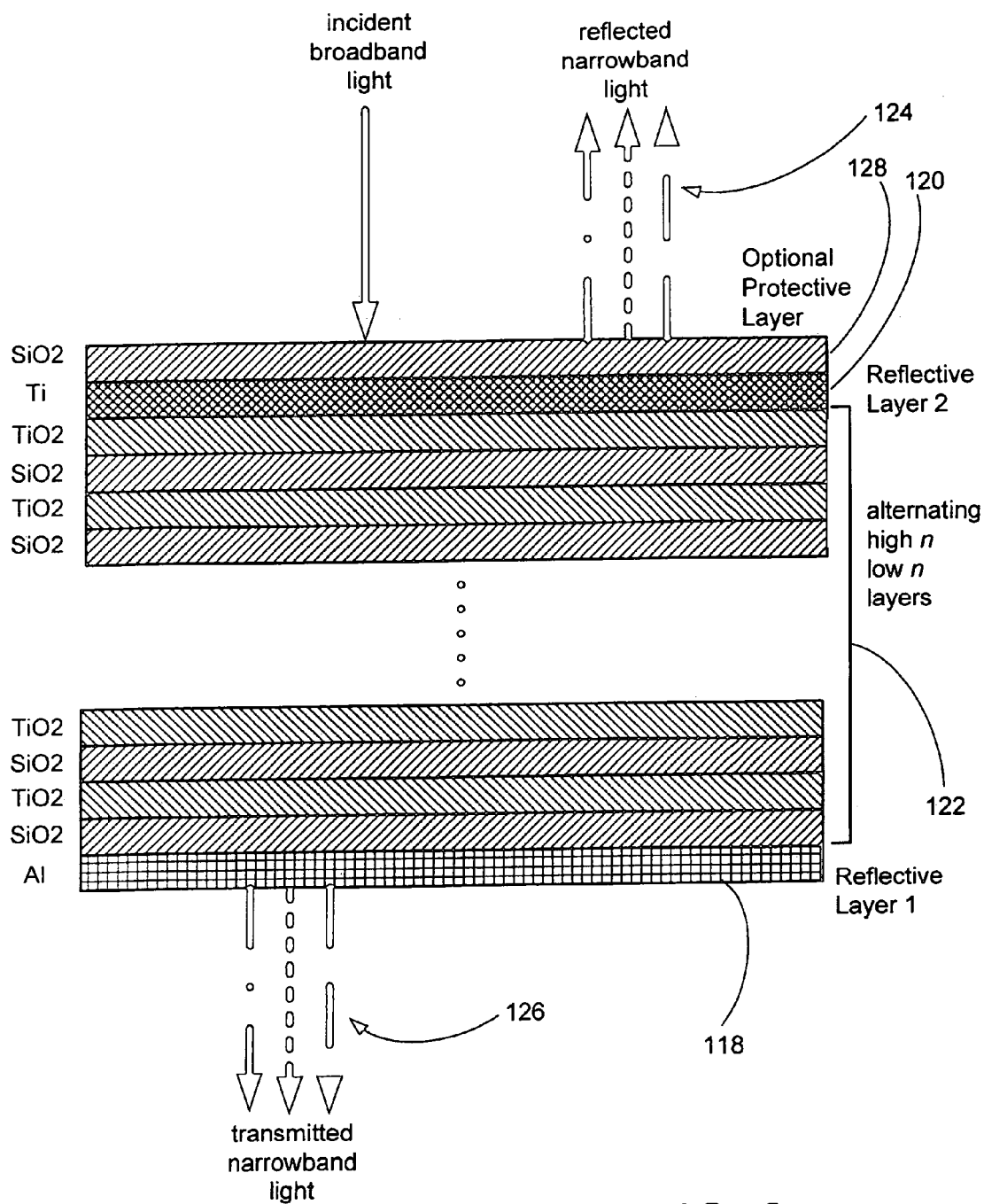
FIG. 6 is a multilayer, multiband etalon structure.

Referring to FIG. 6, there is shown a single stack, multilayer, multiband interference filter using an etalon structure. A first reflective layer 118, for example a highly reflective layer, for example of a material such as aluminum, and a second reflective layer 120, for example of a partially reflective layer of a material such as titanium, are separated by a plurality 122 of layers of dielectric materials, each layer of a material with a different index of refraction (n) than the material of the adjacent layer or layers of dielectric material. The reflectance of light in a plurality of non-harmonic wavelengths (that is, where one or more of the values of m in the of the wavelengths reflected according to the equation $$\lambda = \frac{2d}{m}$$

is not an integer) is significantly greater, as indicated by arrows 124, than light of other wavelengths; light of other wavelengths destructively interferes in the etalon device. If the first reflective layer 118 is partially reflective, typically by adjusting the material or thickness of the layer, the transmittance of light in the plurality of wavelengths is significantly greater, as indicated by arrows 126, than light of other wavelengths. The layers are substantially continuous, that is they extend across substantially all the screen so that all points on the screen uniformly reflect the same wavelength bands. The reflective layers may also be multilayer interference devices with layer thicknesses and materials selected so that the multilayer interference devices are highly reflective broadband; for convenience and simplicity, the reflecting layers will be shown as single layers in the figures. If desired, there may also be an optional protective layer 128 of a suitable material such as $SiO_2$.

Referring to FIG. 7, there is shown a table of materials and thicknesses that, when used in the structure of FIG. 6, selectively reflects (or transmits) light in a plurality of pre-determined non-harmonic wavelength bands such as the red, green, and blue wavelength bands. As with FIGS. 4A and 4B, the layers are listed in order of deposition. So, for example, the Al layer 50.0 nm. thick is the first layer deposited and corresponds to first reflective layer 120 and the $SiO_2$ layer 94.7 nm thick is the last layer deposited and is therefore the optional top protective layer.

Figure 8:
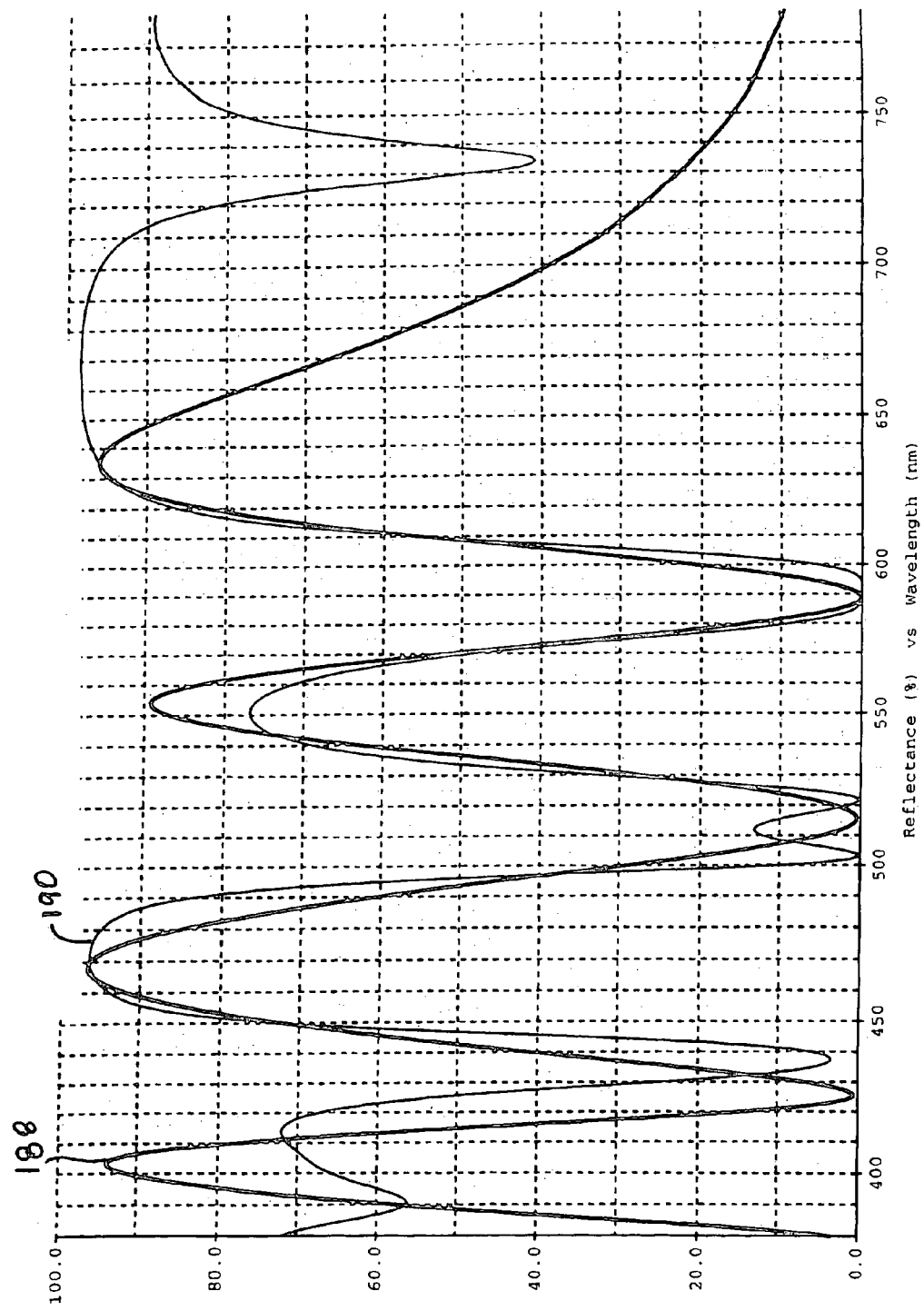
FIG. 8 is a graphical representation of reflectance as a function of wavelength for a multilayer multiband etalon structure and a multilayer multiband non-etalon structure.

Referring to FIG. 8, there is shown a computed plot 188 of the spectral performance of the etalon MLI of FIG. 7 compared to the computed plot 190 of a non-etalon MLI similar to the MLI coatings of FIGS. 4A and 4B. Other combination of materials and layers that selectively reflect light with wavelengths in narrow bands can be designed using software available from Software Spectra Inc., Internet address www.tfcalc.com. The layers may be deposited by a number of techniques. One suitable technique is described in Shimoda, et al., "Multi-layer Dichroic Coatings on Plastic Webs", pp. 58-67 of the *Proceedings of the Thirteen International Conference on Vacuum Web Coating* (Oct. 17-19, 1999) edited by R. Bakish, and available from Bakish Materials Corporation of Englewood, N.J. The layers may also be deposited by other thin film coating techniques, such as evaporation. The layers may be deposited in a manner that permits the MLI to be of sufficient size to be a substantially continuous layer of a projection screen having a width and height of greater than seven inches (17.8 cm), and potentially as large as 60 inches (152.4 cm) or larger.

Referring to FIG. 9, there is shown a graphical representation of reflectance as a function of wavelength for angles of incidence of zero degrees, 7 degrees and 15 degrees to illustrate the effect of angle of incidence on reflectance for a typical coating design (not the one listed in FIGS. 4A AND 4B).

Figure 10B:
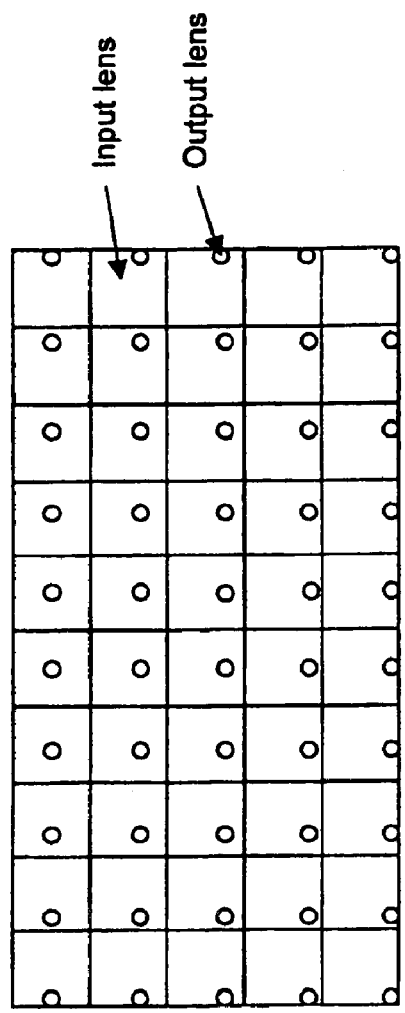
FIG. 10B is a front view of the microlens screen.
Figure 10A:
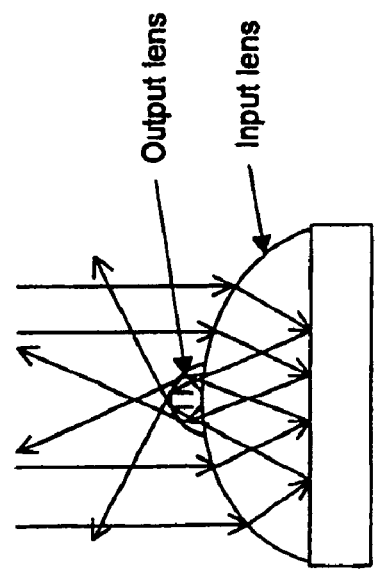
FIG. 10A is a side view of a lens set on a projection screen according to the invention.

Referring to FIG. 10A, there is shown a side view of a lens set on the projection screen having a large input lens 11 and a smaller output lens 12.

Referring to FIG. 10B, there is shown the layout of asymmetric microlenses including an input lens 11 and an output lens 12.

Referring to FIG. 11, there is shown a diffusing MLI (DMLI) structure that includes both diffusing elements and selective reflecting elements. DMLI structure 160 includes a diffuser 150 having an irregular surface so that it reflectively diffuses light. Diffusers may be symmetric, such as a matte diffusers or asymmetric diffusers such as patterned diffusers, both of which are discussed elsewhere in the specification. Diffusers may be substrates with irregular surfaces that diffuse light, or may be substrates with diffusing coatings. Generally diffusers that provide a diffusion angle (that is, the angle relative to the normal to the screen surface at which the reflected light has half the power of the reflected light at the normal) of 0-30 degree in the vertical direction and 5-30 degrees in the horizontal direction are suitable. Coated on the diffuser 150 is an etalon type selective reflector 152. The etalon type selective reflector includes a first reflecting layer 154 and a second reflecting layer 156. Between reflecting layer 154 and 156 are a plurality 158 of layers of dielectric materials, each layer of a material with a different index of refraction (n) than the material of the adjacent layer or layers of dielectric material, as described above in the discussion of FIG. 6.

Referring to FIG. 12, there is shown an enlarged cross sectional view of a portion, such as portion 192 of the diffuser 150, the first reflecting layer 154 and some of the dielectric layers 158. As stated above, the layers are substantially continuous, that is they extend across substantially the entire viewable area of the screen. The reflecting layers and the dielectric layers generally follow the contour of the diffuser, but depending on the type of coating process used, the thickness of the dielectric layers may not be uniform, so that subsequent layers may have slightly different contours than the contours of the diffuser and of the previously deposited layers. For example, the coating thickness at portions of the surface that are more parallel to the plane 194 (which appears as a straight line in cross-section) of the screen may be thicker than portions of surface that are less parallel to the plane of the screen as shown in FIG. 12. In circumstances in which some of the coating material approaches the diffuser in a direction (for example as indicated by arrow 196) that is non-perpendicular to the plane of the screen, portions of the surface that are more perpendicular to the direction of coating material approach may be thicker (not shown in this view) than portions of the surface that are less perpendicular. The variation in coating thickness will be discussed further below.

Figure 13:
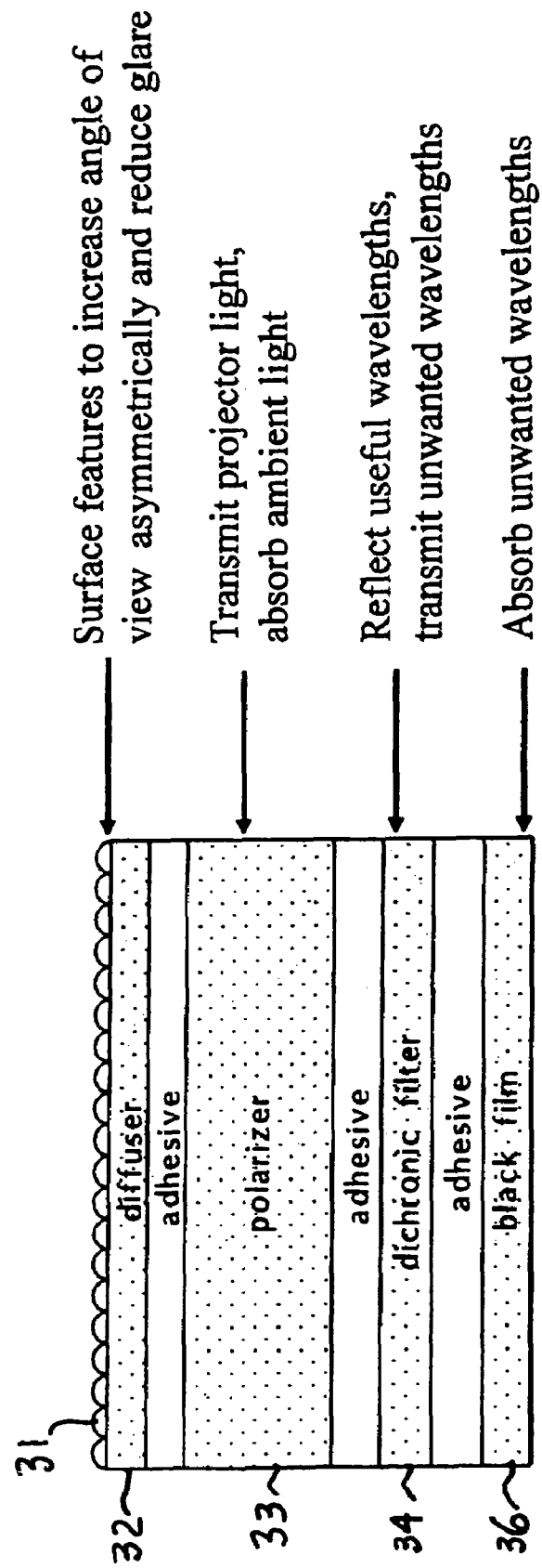
FIG. 13 is a sectional view through an exemplary projection screen according to the invention having a front surface diffuser only.

Referring to FIG. 13, there is shown a cross section through an exemplary projection screen according to the invention formed of a black film 13 attached by transparent adhesive layer 14 to a dichroic filter 15 that reflects useful wavelengths while transmitting unwanted wavelengths to black film 13. Dichroic filter 15 is attached by low-birefringence transparent adhesive layer 16 to polarizer 17 that transmits the projector light while substantially absorbing ambient light. Polarizer 17 is attached by low-birefringence transparent adhesive layer 18 to diffuser 19 having surface features to increase the angle of view asymmetrically and reduce glare.

Referring to FIG. 14, there are shown the cross sections of projection screens like that in FIG. 13, with various modifications. The projection screen of FIG. 14A includes a front diffuser 19 and no other diffusers. The projection screen of FIG. 14B includes a front diffuser and an embedded diffuser.

Figure 15A:
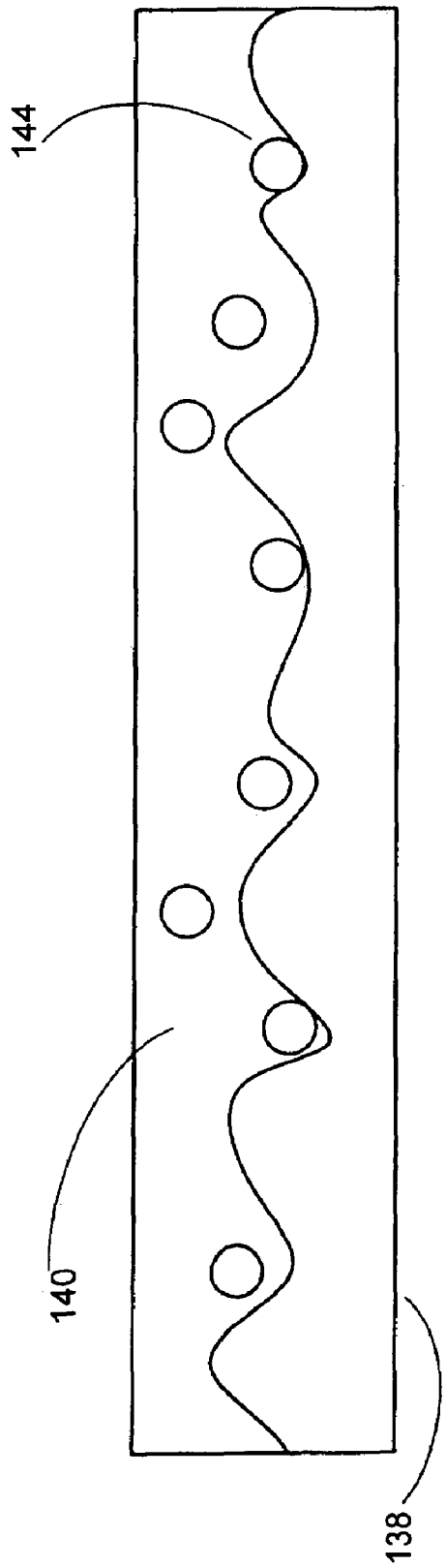
FIG. 15A is a cross sectional view through a structure including an exemplary diffuser and an exemplary adhesive layer.

Diffusers may be laminated to adjacent layers or components by adhesives. Referring to FIG. 15A, there is shown a diffuser 138 that has applied to it a pressure sensitive adhesive layer 140 applied according to the process of FIG. 15B. In step 206, adhesive in the cured ("sticky" or "tacky") state is applied to a component such as a diffuser. In step 208, a subsequent component, not shown, is applied.

Figure 16A:
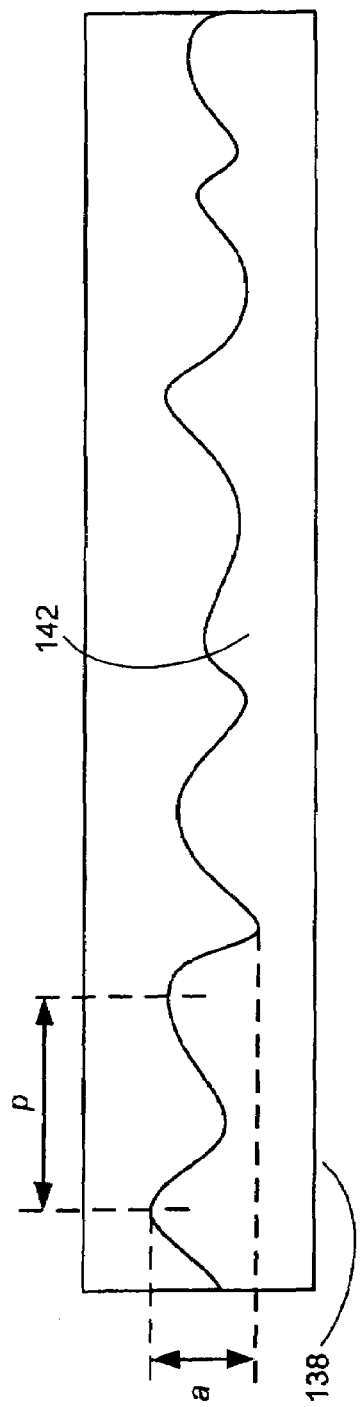
FIG. 16A is a cross sectional view through a structure including an exemplary diffuser and an exemplary adhesive layer including b-stage adhesive.
Figure 16B:
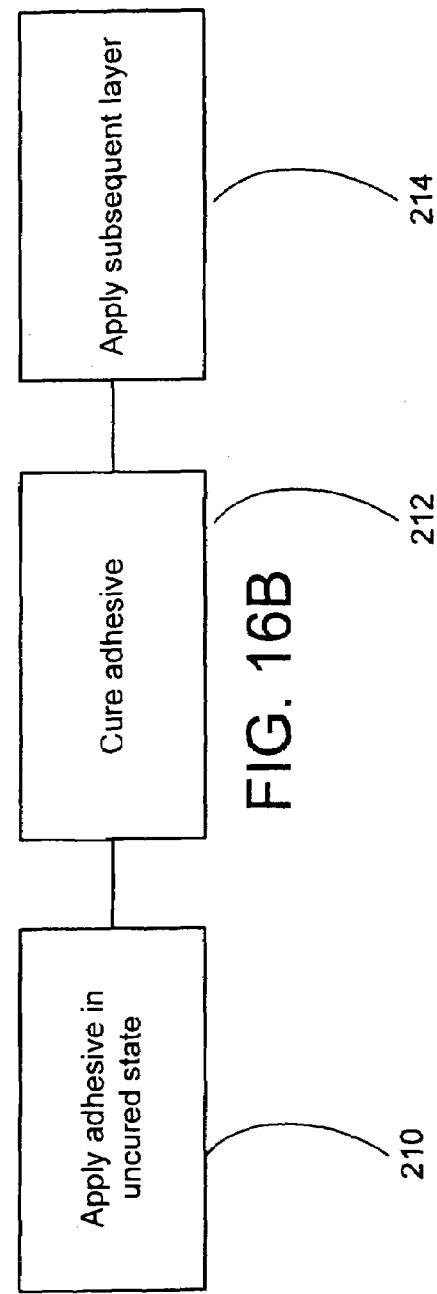
FIG. 16B is a block diagram of a process for providing the structure of FIG. 17A.

Referring to FIG. 16A, there is shown a diffuser 138 that has applied to it a pressure sensitive adhesive layer 142 applied according to the process shown in FIG. 16B. In step 210, adhesive in the uncured or "b-stage" state is applied to a component such as a diffuser. In step 212, adhesive is cured. In step 214, a subsequent layer, not shown, is applied.

Referring to FIG. 17, there are shown the cross sections of other projection screens showing additional details and variations of some of the elements.

Figure 17A:
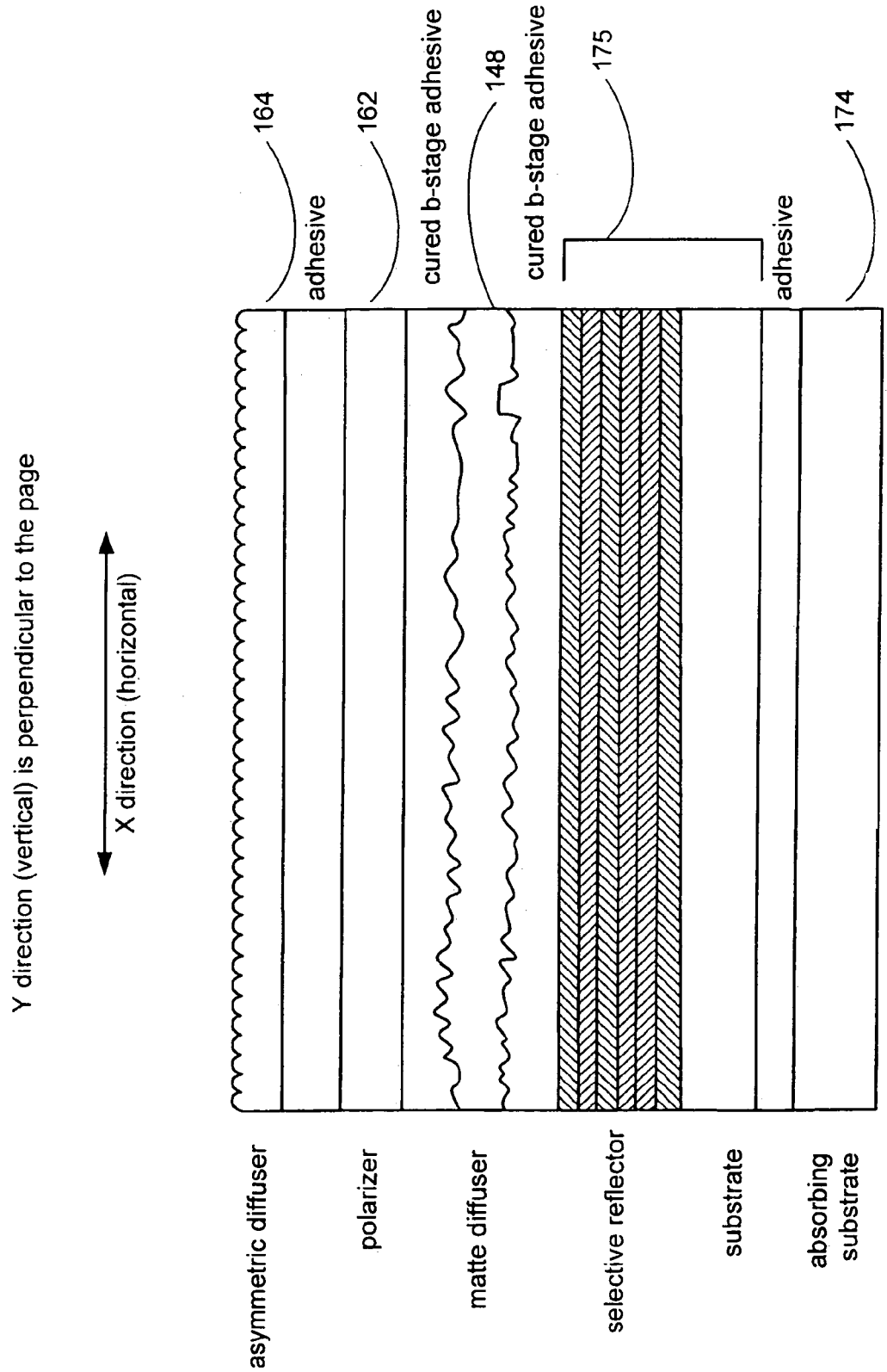
FIGS. 17A-17F are sectional views through an exemplary selective reflecting projection screens.

In FIG. 17A, there is shown a projection screen. An absorbing substrate 174 is laminated to a single stack, multiband, multilayer selective reflector 175, for example of the type shown in FIG. 3. The single stack, multiband, multilayer selective reflector is laminated to matte diffuser 148 by adhesive applied in an uncured (b-stage) state and then cured (for simplicity hereinafter and in the figures referred to as "cured b-stage adhesive"). Polarizer 162 is laminated to matte diffuser 148 in the same manner. Front diffuser 164, which may be a matte diffuser or, as shown in this view, some sort of diffuser that diffuses asymmetrically in the X and Y directions, may be laminated to polarizer 162 by conventionally applied adhesive.

Figure 17B:
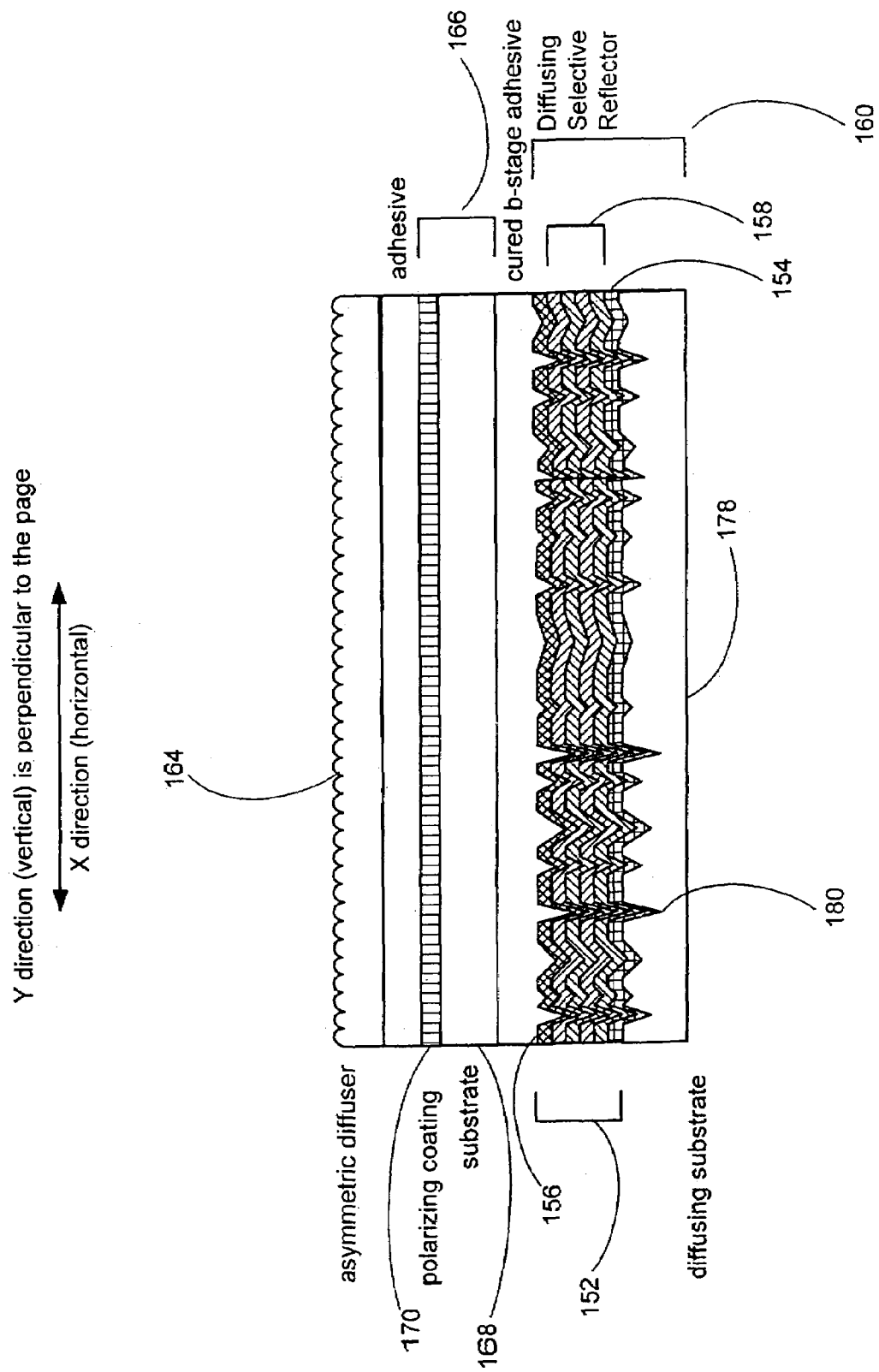

In the projection screen of FIG. 17B, a diffusing selective reflector 160 as shown in FIG. 11 includes a diffusing substrate such as a diffusing substrate 178, which may be formed by brushing vertical scratches such as scratch 180 on the surface of the diffuser, which causes light to be diffused more in the X (horizontal) direction than in the Y (vertical) direction. Coated on the diffusing substrate 178 is an etalon type selective reflector 152 that includes a first reflecting layer 154 and a second reflecting layer 156. Between reflecting layer 154 and 156 are a plurality 158 of layers of dielectric materials, each layer of a material with a different index of refraction (n) than the material of the adjacent layer or layers of dielectric material, as described above in the discussion of FIG. 6. Laminated to the diffusing selective reflector 160, by cured b-stage adhesive is polarizer L66 which includes a substrate 168 that is coated with a polarizing coating 170, such as the coating described in U.S. Pat. No. 5,739,296. Polarizer 166 may also be a conventional polarizer. Laminated to polarizer 166 by conventionally applied adhesive may be a front asymmetric diffuser 164.

Figure 17C:
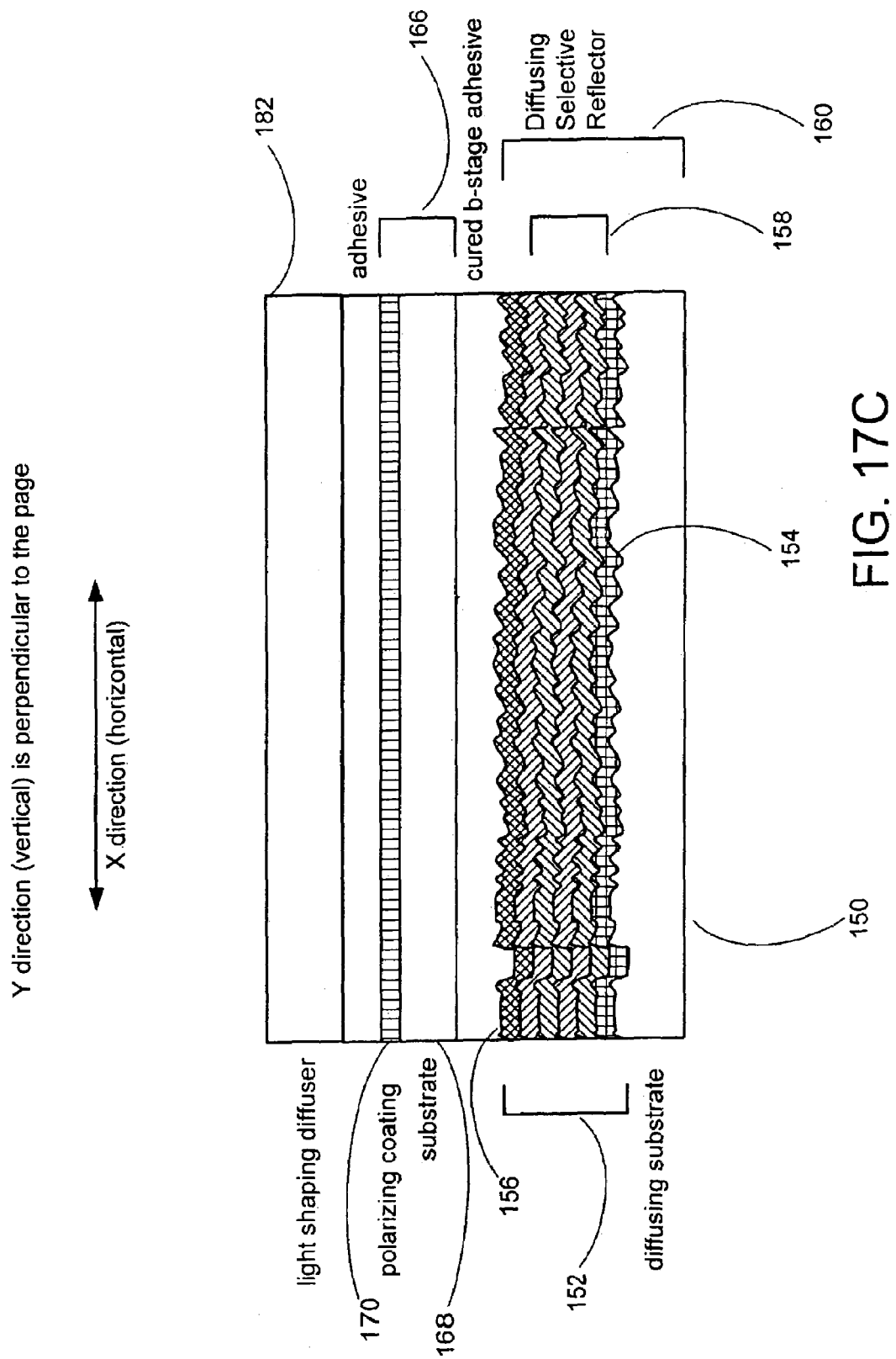

Referring to FIG. 17C, there is shown a projection screen similar to the screen of FIG. 17B, with the front diffuser 164 replaced with a light shaping diffuser 182. The light shaping diffuser may be constructed and arranged to asymmetrically diffuse light or to create other diffraction patterns as discussed below in the discussion of FIG. 21. In addition, the vertically brushed diffusing substrate 178 is replaced by a matte substrate 150.

Figure 17D:
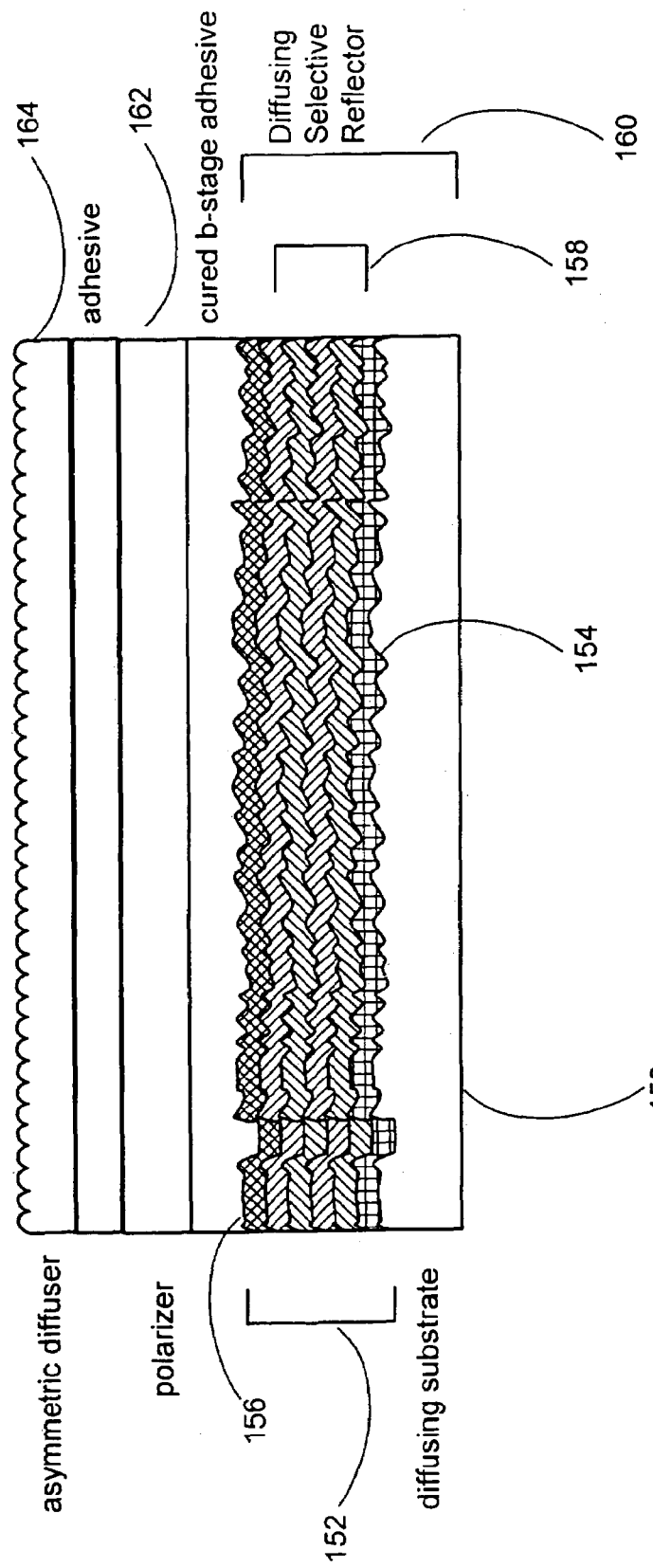

Referring to FIG. 17D, there is shown a projection screen similar to the screen of FIG. 17C, with the polarizer 166 of FIG. 17C replaced by a conventional polarizer 162 and the light shaping diffuser of FIG. 17B replaced by a asymmetric diffuser 164.

Figure 17E:
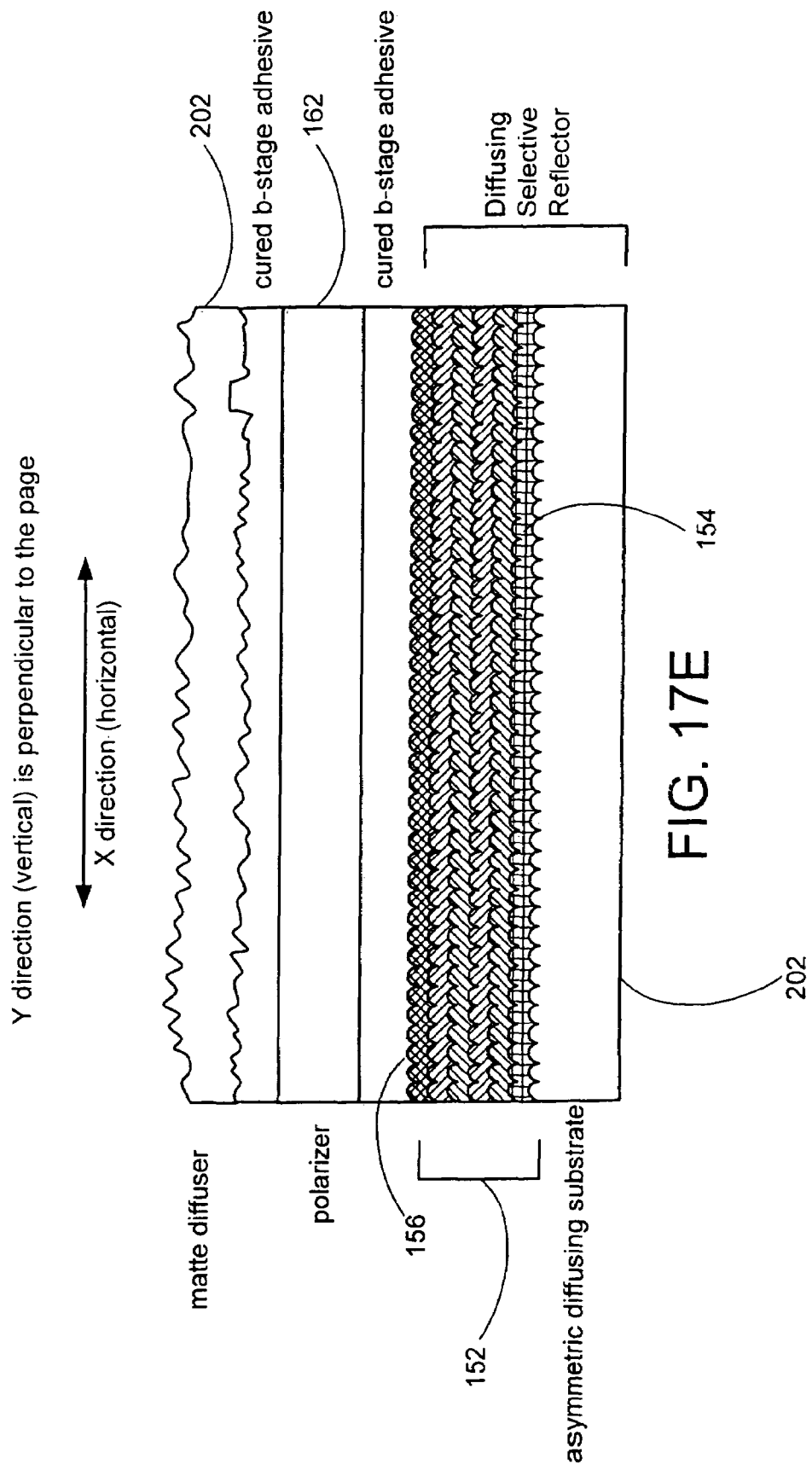

Referring to FIG. 17E, there is shown a projection screen similar to the screen of FIG. 17D, with the matte diffuser of FIG. 17D replaced by an asymmetric diffusing substrate, for example a substrate with a lenticular pattern as described elsewhere herein, and the front diffuser of FIG. 17D replaced by a matte diffuser 202.

Figure 17F:
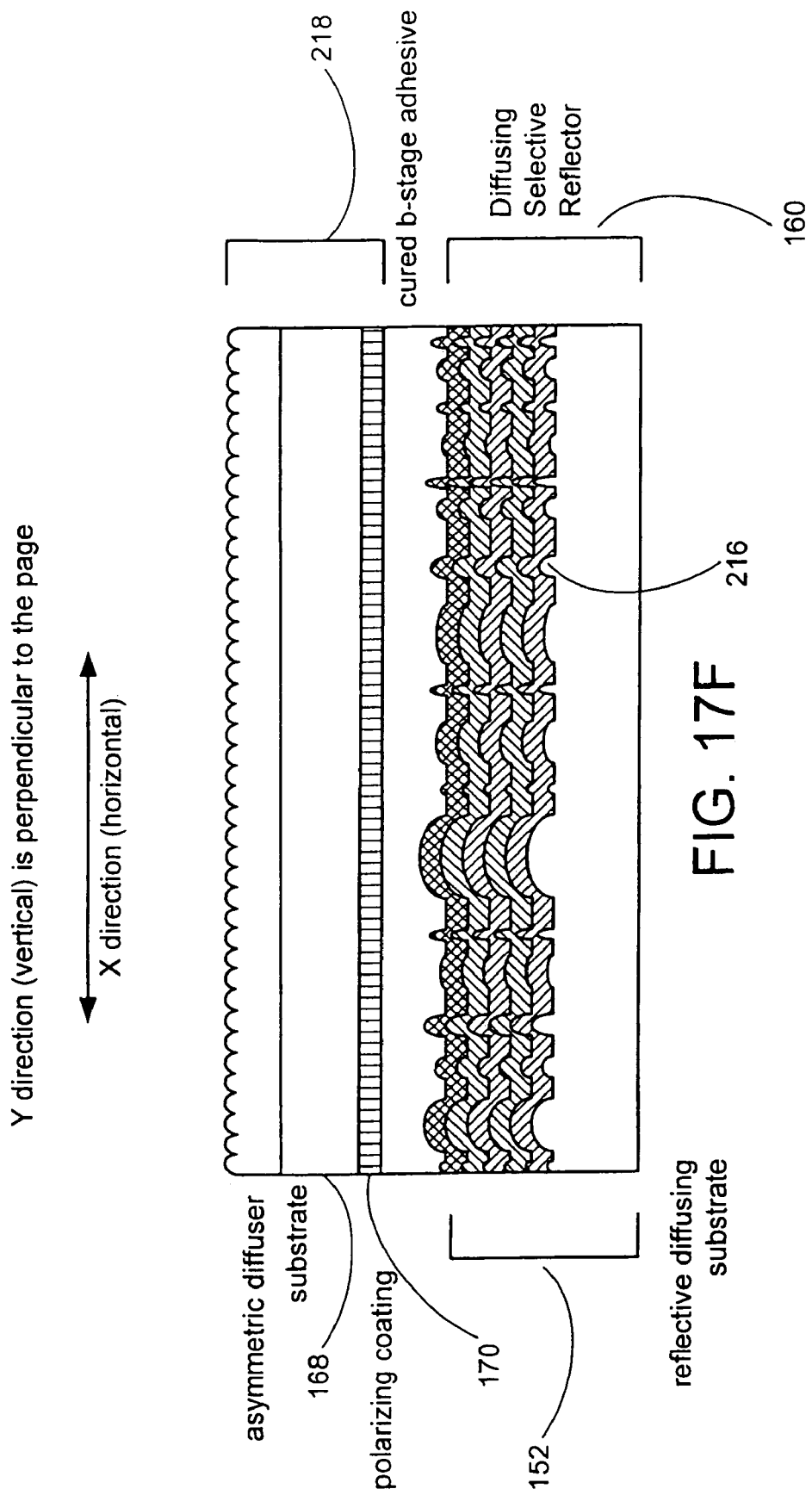

Referring to FIG. 17F, there is shown a projection screen including a DMLI laminated by cured b-stage adhesive to a polarizer/diffuser 218. The diffusing MLI includes an aluminum substrate with bumps such as bump 216. The polarizer/diffuser includes a substrate with a polarizing coating (as described above) coated on one side and a diffuser, such as an asymmetric diffusing layer on the other side. The polarizer/diffuser is laminated to the diffusing selective reflector, with the side with the polarizing coating facing the diffusing selective reflector.

Figure 17G:
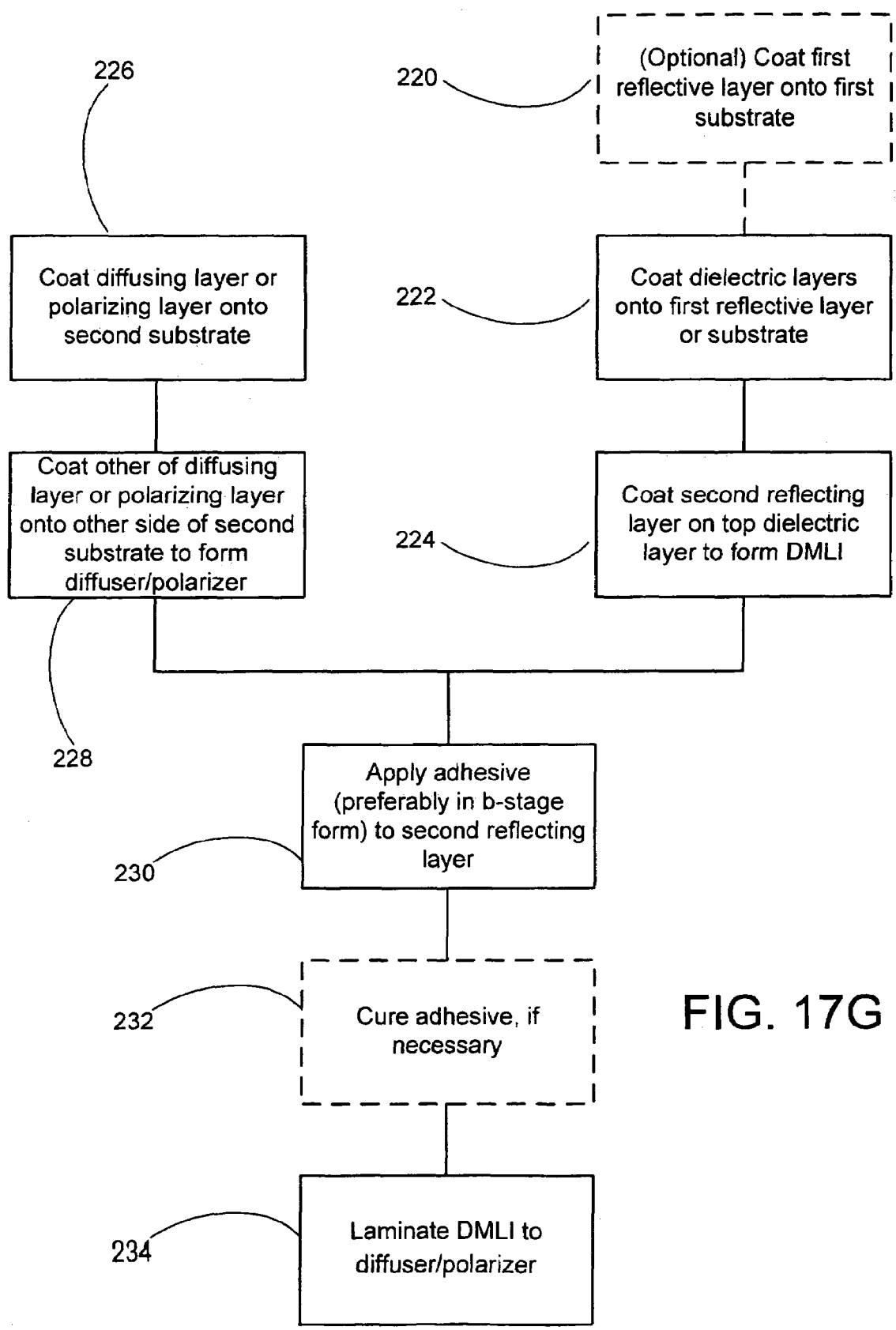
FIG. 17G is a block diagram of a process for providing the structure of FIG. 18F.

The projection screen of FIG. 17F may be made by the process shown in FIG. 17G. In an optional step 220, the first reflecting layer of a DMLI is deposited on a first substrate. The step is optional, because with the use of a first substrate with a reflecting surface, the first substrate may operate as the first reflective surface. In step 222, the dielectric layers are deposited on the first reflective layer or substrate. In step 224, the second reflective layer is deposited on the dielectric layers to form the DMLI. In step 226, the front diffusing layer or the polarizing layer is deposited on to a second substrate. In step 228, the other of the diffusing layer or the polarizing layer is deposited onto the other side of the second substrate. In step 230, adhesive, preferably in b-stage form, is applied onto the second reflecting layer. In optional step 232, the adhesive is cured, if necessary. In step 234, the DMLI is laminated to the diffuser/polarizer with the second reflective layer adjacent the polarizing layer.

Generally, the projection screens of FIGS. 17A-17F can be made by obtaining or manufacturing the components, the laminating the components, arranged as shown in the figures, using adhesives, which may be applied conventionally in cured form, or may be applied in uncured form and cured, as stated elsewhere in the specification. MLI or DMLI structures can be formed by step 222 (and steps 220 and 224 for etalon devices) of FIG. 17G. Front diffusers can be in the form of diffusing substrates or as substrates with diffusing coatings as described elsewhere in this specification. Polarizers can be manufactured by depositing a polarizing coating on a substrate, or made or obtained as conventional polarizers. Embedded diffusers can be obtained as conventional matte diffusers or by using diffusing adhesives, or both. Absorbing substrates can be manufactured by depositing an absorbing coating on a substrate or by obtaining a conventional absorbing substrate. In constructions such as shown in FIG. 17F, a combined polarizer/diffuser can be made as shown in steps 226 and 228 of FIG. 17G, and substituted for the polarizer and diffuser of FIG. 17D.

Figure 18:
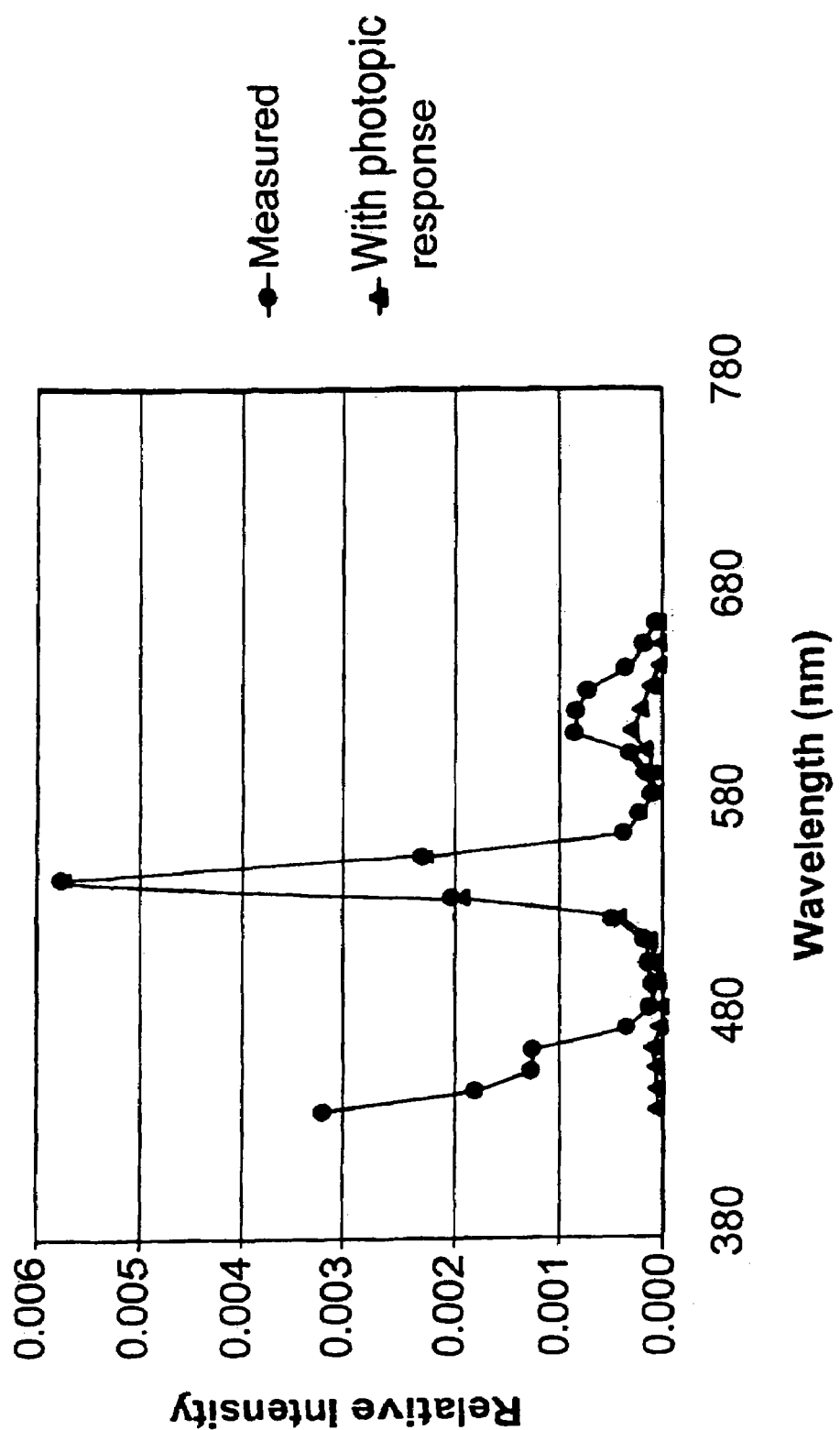
FIG. 18 is a graphical representation of the spectrum of filtered projector light as a function of wavelength.

Referring to FIG. 18, there is shown a spectrum of an exemplary filtered projector light as a function of wavelength having advantages which will be discussed below.

Figure 19:
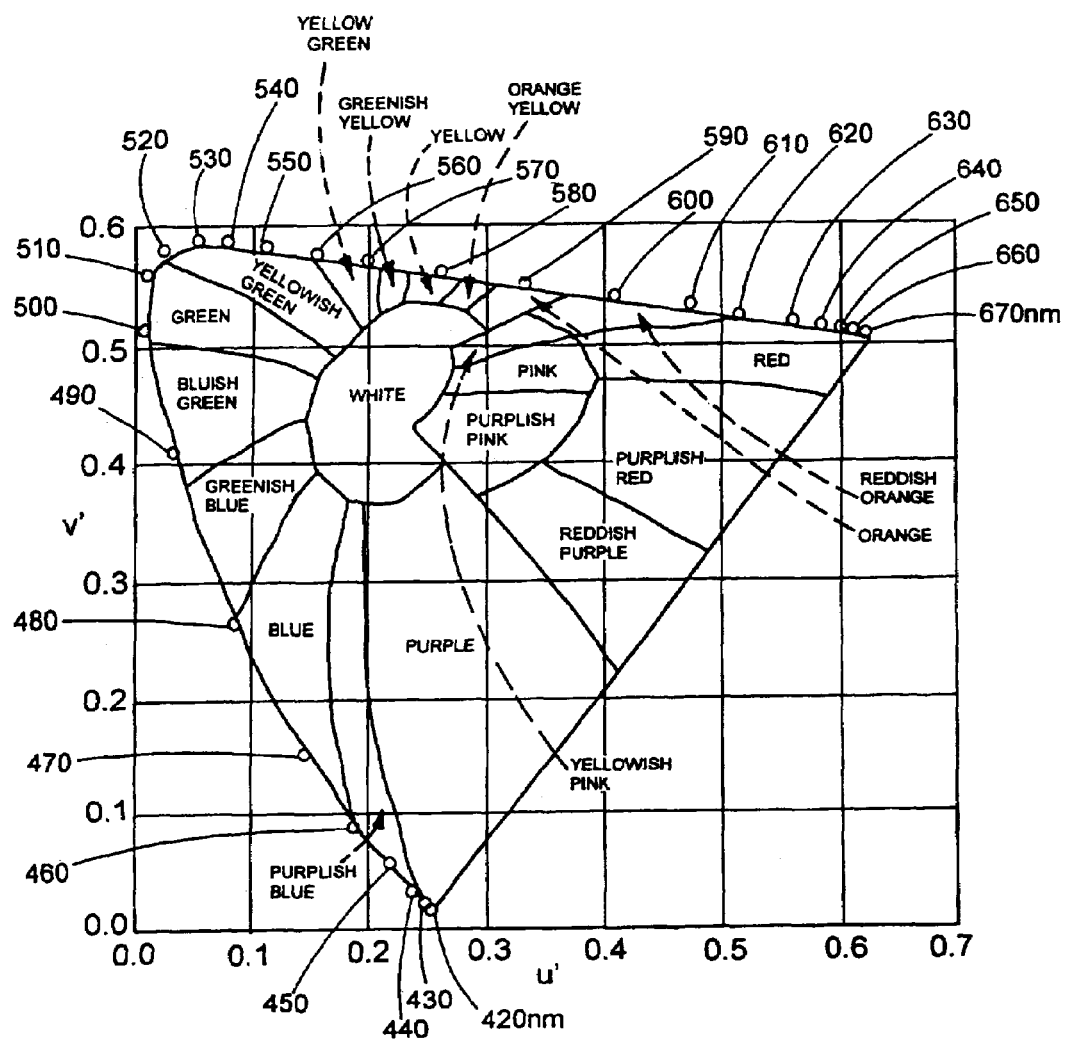
FIG. 19 is a color chart relating optical wavelengths to colors.

Referring to FIG. 19, there is shown a color chart with optical wavelengths for the different colors.

Figure 20:
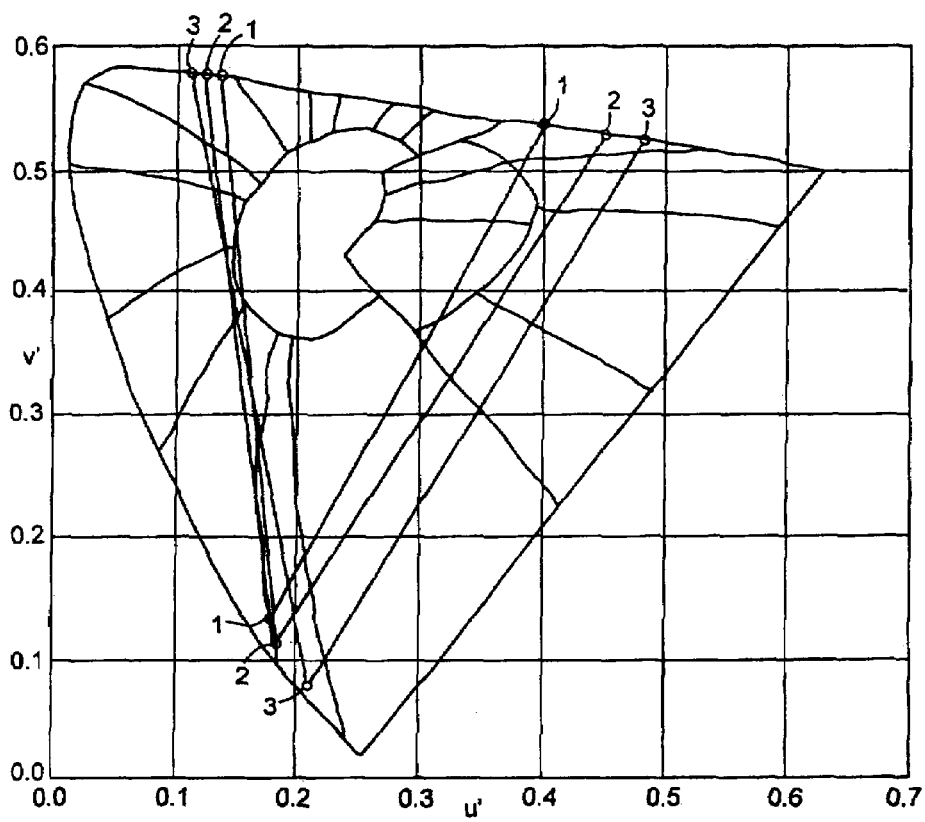
FIG. 20 is a color chart illustrating improved performance achieved with the invention.

Referring to FIG. 20, there is shown a comparison of color performances illustrating improved color performance in progressing from (1) a projector on a white screen, (2) a filtered projector on a white screen, and (3) a filtered projector on the screen according to the invention. Observe that the area of the color triangle embraced by points 3 corresponding to the filtered projector on the screen according to the invention is greater than that of the triangles embraced by points 1 and 2.

Figure 21A:
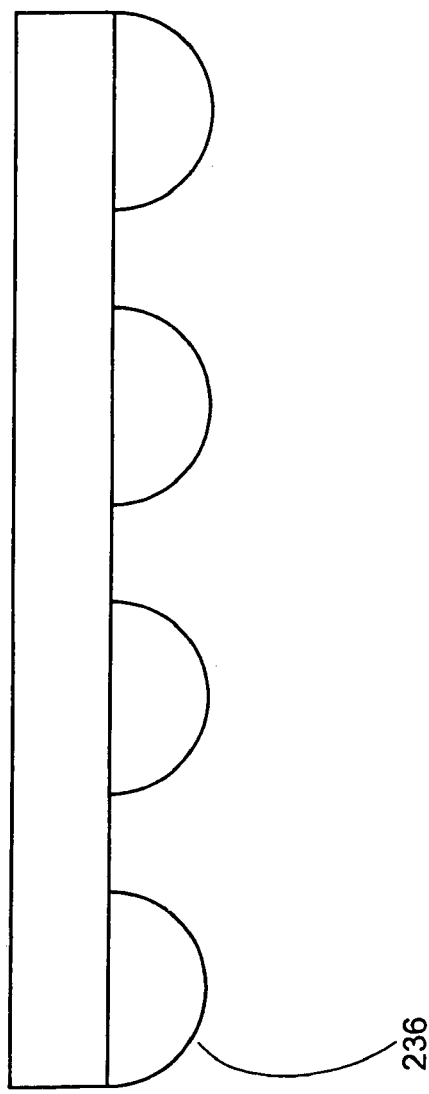
FIGS. 21A and 21B are exemplary reflection patterns.

FIGS. 21 and 22 show reflection patterns for the purpose of explaining the reflection patterns of FIG. 23. Reflection patterns are indicated by "lobes" which represent the amount of light that is diffused by the screen in each direction. A reflection pattern such as the semicircular lobe 236 in FIG. 21A is highly diffuse, that is, the light reflects uniformly in all directions. A reflection pattern such as in 21B is highly directed, as indicated by lobe 198 that is narrow and has a maximum along axis 200.

Referring to FIG. 22, there is shown a conventional viewing arrangement suitable for the configuration in which the projector 130 is mounted above the heads of the viewers, and the light reflected by the screen 132 has a reflection pattern indicated by lobes such as element 134, with axes, such as axis 184 that are substantially perpendicular in the X-Z plane to the plane of the screen.

Referring to FIG. 23A, there is shown a viewing arrangement suitable for a configuration in which the projector 130 and screen 132 are located generally on the same level as the viewers, so that there are no viewers that are directly in front of the middle of the screen. The light reflected by the screen has a bi-lobed reflection pattern as indicated by bi-lobed reflection pattern indicators such as element 136. The bi-lobed reflection pattern has two local maxima in directions indicated by axes 186, that are not perpendicular to the screen. If desired, the lobes may be horizontally symmetric.

Referring to FIG. 23B, there is shown a configuration in which the screen 132 is located above the viewers. The light reflected by the screen 132 has a reflection pattern indicated by lobes such as element 134 with an axis 184 that is directed generally down toward the viewing area so that it is not perpendicular in the Y-Z plane to the plane of the screen. Similarly, other configurations may have a reflection pattern is directed to the left, right, or up. In another configuration, such as in FIG. 22, the reflection pattern could be directed so that light that approaches the screen at an angle is reflected perpendicularly to the screen. A method for controlling the reflection pattern is discussed below.

Figure 23C:
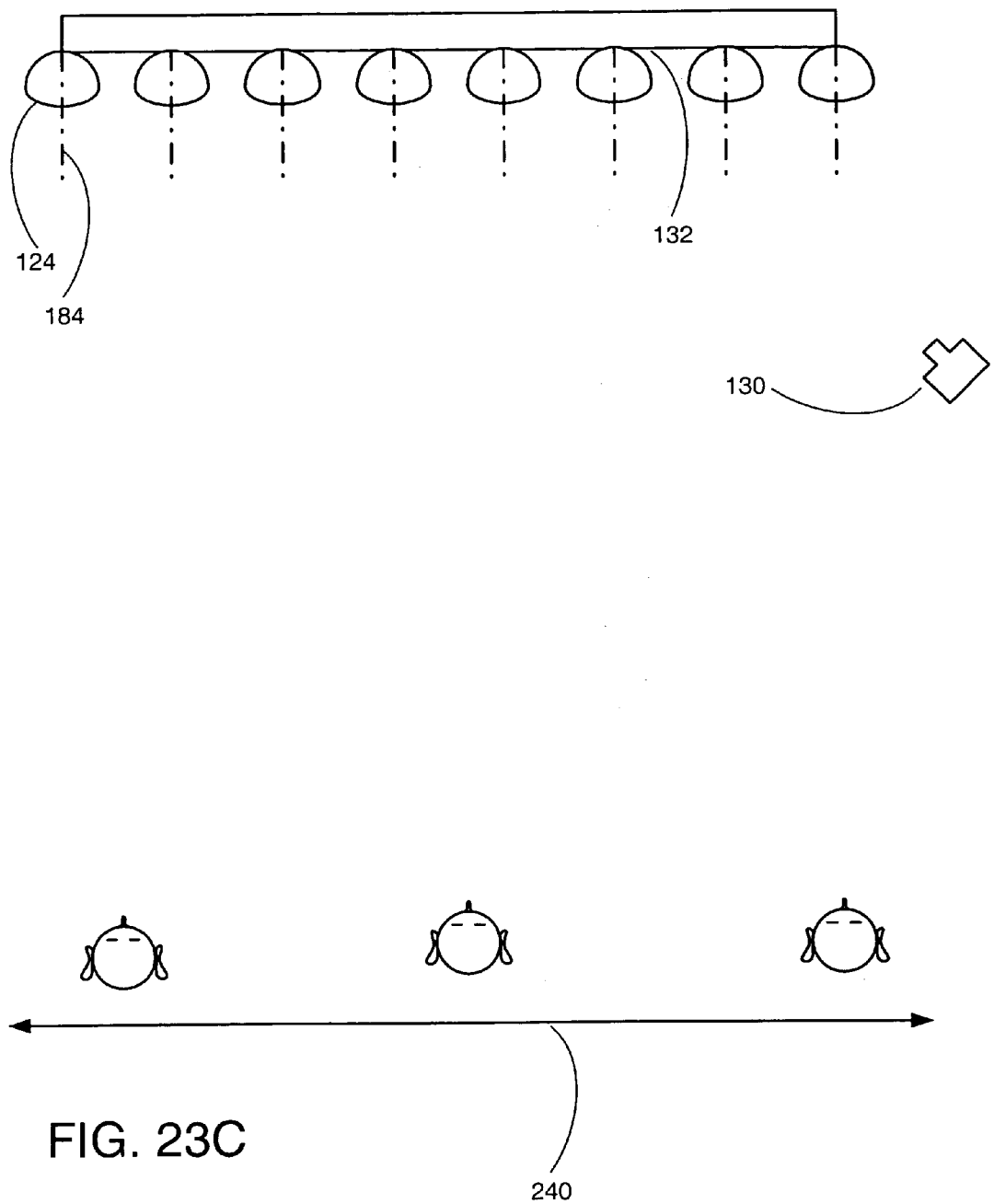

Referring to FIG. 23C, there is shown a configuration in which the projector 130 is positioned off-center relative to the screen 132 and faces the screen at an angle. The light reflected by the screen has a reflection pattern indicated by lobes such as lobe 124, with an axis 184 that is perpendicular to the screen in the X-Y plane.

Having described certain structural features and optical concepts, it is now appropriate to consider more detailed structural features and advantages of the invention.

The invention provides a high-contrast front-projection video system especially advantageous where there is substantial ambient light, such as in a lighted room. The high-contrast projection screen reflects projector light back to the viewer without reflecting a substantial amount of ambient light from the room. It typically achieves this by (1) reflecting narrow-band peaks of blue, green and red projector light while absorbing light energy of other wavelengths, such as those in the more broadband ambient light spectrum, (2) reflecting light from a polarized projector while absorbing a large percentage of unpolarized ambient light, and (3) steering the reflected projector light from the projection screen into the viewing area by lensing and/or diffusion while not accepting ambient light from off axis. Not only do these features improve contrast ratio, but reflecting the narrow-band peaks of primary colors improves color as shown above.

One approach for achieving wavelength selective reflection is to use a multilayer interference coating, such as shown in FIGS. 4A AND 4B, which reflects narrow-band blue, green and red while transmitting light energy of other wavelengths or causing light of other wavelengths to destructively interfere. If needed, a black coating behind the interference coating absorbs the transmitted energy of other wavelengths. The spectral shape of the wavelength-selectable coating preferably matches the spectral shape of the projector light source and reflects primary colors with high intensity. Matching the spectral shape of the projector light source achieves high reflection of projector light while absorbing high levels of ambient light. By selectively reflecting the primary colors with high intensity there is a larger color gamut effectively achieved by removing yellow contamination in the green, removing orange contamination in the red and moving the blue peak towards the blue corner of the color triangle.

FIGS. 2 and 3 show two different types of selective reflectors including multilayer interference (MLI) coatings. In a prior art MLI shown in FIG. 2, an MLI filter for reflecting red, an MLI filter for reflecting blue, and an MLI filter for reflecting green are arranged one upon another. Each of the MLI filters includes a substrate 102, 106, 110 each of which should be thicker than the coherence length of the light, typically on the order of a few microns for projectors using a UHP bulb. Each of the MLI filters also includes a plurality 104, 108, 112 (referred to as a "stack") of layers alternating high n and low n materials. Each of the MLI filters functions independently. For example, if the red MLI filter is removed, the blue MLI filter will continue to reflect light in the blue wavelength band and the green MLI filter will continue to reflect light in the green wavelength band. Additionally, the overall effect of the device is not affected by the order of the blue, green, and red MLI coatings. So, for example, if the green MLI filter were the top filter and the red MLI filter were the bottom filter, the optical effect of the MLI coating of FIG. 2 is unaffected.

In FIG. 3, there is a single substrate 114 and a single stack including a plurality 116 of consecutive layers of dielectric material (that is, there are no intervening components, such as substrates, that are not one of the layers of dielectric materials) that, collectively have a much higher reflectance of light in the red, green, and blue wavelength bands than of light in other wavelength bands. Two combinations of materials and thicknesses of layers that reflect light with wavelengths in the red, green, and blue wavelength bands are shown if FIGS. 4A and 4B. If any of the layers of FIGS. 4A and 4B are omitted or removed, the reflection of red, blue, and green light will all be affected. There is no single layer or combination of layers that affects the reflection of light in the red, green, or blue wavelengths only. If the order of layers is altered, the red, blue, and green wavelength bands will all be affected.

A multiband MLI coating in accordance with FIG. 3 has only one substrate for all three wavelength bands that are reflected, which is especially advantageous over the configuration of FIG. 2 because there are fewer substrates. The multiband MLI coating of FIG. 3 does not require an adhesive layer between the three single band filters. The total number of dielectric layers in a multiband MLI coating is much less than the total number of dielectric layers of the three single band MLI coatings and the total thickness of the dielectric layers of the three single band MLI coatings is much less than the total thickness of the dielectric layers of the three single band MLI coatings. In another implementation, a multiband MLI coating that selectively reflects two narrow wavelength bands could be laminated to a single band MLI coating by an adhesive layer. A multiband MLI is advantageous because fewer substrates, fewer adhesive layers and less total thickness of the dielectric layers permits the screen to be thinner, so the screen can be made rollable. The reduced total coating thickness of the screen and the elimination of adhesive layers between the three single band filters permits a simpler, less costly coating process.

For a color projector based on red-green-blue (RGB), primary colors, wavelength regions for reflection at the screen are preferably approximately (blue) 450-490 nm, (green) 540-570 nm, and (red) 610-650 nm. Making these regions narrower increases the effectiveness of the spectral selectivity. Optical energy of other wavelengths is preferably absorbed at the screen or caused to destructively interfere.

An alternate way of describing the wavelength selective property is by the narrowness of the reflection bands. The bands are preferably no wider than approximately 10 percent of center wavelength (at full width half maximum, FWHM) to get at least some contrast improvement. The bands are preferably no wider than 6 percent of center wavelength to get a larger contrast improvement effect. Since the eye is most sensitive to light near its green wavelengths as shown in FIG. 1, these width guidelines apply primarily to the green peak. The width of the red and blue peaks need not be as important.

The multilayer interference (MLI) coating, also called multilayer dielectric coating or dichroic coating, comprises many layers dielectric materials, each layer formed of material with a different index of refraction (n) than the material of the adjacent layer or layers. One common form of MLI includes alternate low index-of-refraction and high index-of-refraction materials as shown in FIGS. 4A and 4B. These are typically dielectric (nonlight-absorbing) materials which are sputter deposited in a vacuum chamber. A typical low index material is $SiO_2$. Typical high index materials are $TiO_2$, $Ta_2O_5$, and $Nb_2O_5$. By choosing each layer to be the proper thickness, examples being shown in FIGS. 4A AND 4B, the small reflections between the layers can be caused to either constructively or destructively interfere as a function of optical wavelength. This structure allows light to be either reflected or transmitted as desired for each wavelength of light energy. Typical thicknesses of the layers are approximately 100 nm average for the low index material and 70 nm average for the high index material. In order to achieve adequately narrow band peaks and valleys according to the invention, there are preferably approximately 5 to 50 layers. The total coating thickness is typically in the range of approximately 1000 to 6000 nm. FIGS. 4A AND 4B show an example of a multilayer interference coating according to the invention with layer thicknesses. FIG. 5 shows the spectral performance of the design shown in FIG. 4 (without a diffuser).

Referring again to FIGS. 6-8, a single stack, multilayer, multiband selective reflector using an etalon structure can be constructed and arranged so that it is suitable for a projection screen. The spectral response shown in FIG. 8 has substantially symmetric peaks centered at desired wavelengths and with suitable slopes. Other approaches using etalon structures with single dielectric layers may have undesirable "sawtooth" spectral patterns. As opposed to non-etalon interference filters, an etalon structure is desirable for selective reflecting screens because light energy at undesired wavelengths destructively interferes in the etalon structure and therefore a projection screen using an etalon type interference filter does not require a separate absorber.

The optical performance of the dichroic coating is related to the angle of incidence (AOI) of light impinging upon it. FIG. 9 shows the effect of varying the AOI throughout the range of a typical projector-screen geometry. In this example, the projector is typically mounted on the ceiling. The minimum angle is approximately zero degrees and occurs at the upper center of the screen. The maximum angle is approximately 15 degrees and occurs at the lower left and right hand sides of the screens. In actuality, the differences visible across the screen do not vary as much as that shown in FIG. 9, partly because the diffuser tends to average the angles so that all positions have a more similar range of angles.

A variety of methods can be used to reduce the effect of high angle-of-incidence light on the interference coating. The screen can be coated non-uniformly so that each position on the screen has a pre-shifted coating that compensates for the angle of incidence at that position. Another method is to curve the screen so that the angle stays more nearly constant.

The ambient light has a large fraction that comes in at relatively high angles. At high angles, the green peak shifts significantly to the left so that a dip in reflection occurs in the green. Because the eye is more sensitive to green than the other colors, that shift significantly reduces the amount of ambient light seen on the screen and thus helps improve contrast ratio. Another angle-related consideration is the shift at the far right-hand side of FIG. 9. At high angles, the light in the far red (660 to 750 nm) shifts to the near red (630 to 650 nm) and would make the screen look too red overall. By having the coating constructed and arranged to have relatively low reflection in the far red region, this effect is reduced.

The dichroic coating may be made in a small batch process, or using roll-coating machines, using a large roll-coater to make the multilayer interference coating on thin plastic film. The coating may be deposited bidirectionally in pairs of high and low index-of-refraction materials. There may be a constant ratio (determined by the relative deposition speeds) between the thicknesses of the materials in each pair. Each pass through the coating machine allows a variation of coating speed which results in "x" independent variables for coating with "x+1" layers while allowing high deposition speed for all materials at all times.

By using layers of intrinsically absorbing materials (for example, Si and Nb) along with typical dielectric materials, the rear absorber can be eliminated and the coating can be made approximately half the thickness for the same optical effect, thereby reducing cost. Alternately, the coating may be deposited directly on an absorbing substrate or an absorbing layer of material may be deposited directly on the substrate under the dielectric materials.

An alternative method for using an interference coating is to transfer the coating from its original substrate onto the back of another substrate. This allows the elimination of the PET substrate thus making the screen thinner and more rollable. The coating could be transferred to the back of the internal diffuser or to the polarizer, both are typically materials (CTA or polycarbonate) which cannot be interference coated directly due to their outgassing and poor coating adhesion).

Another feature of the high contrast projection screen according to the invention is the diffuser which directs the reflected light to the viewing location. The diffusers may be surface diffusers or textured bulk diffusers. Surface diffusers are made in a number of ways. Some diffusers, such as matte diffusers, may be made with an irregular surface. Other surface diffusers may be made by using a holographic or numerically controlled fabricating process to etch a master which is then used to emboss a surface pattern upon a thin, UV-cured coating. Surface diffusers may be patterned diffusers having a lenticular pattern. Lenticular patterns may include patterns that are elongated in the Y direction and have a cross section in the X-Z plane that is semi-circular, semi-elliptical, or some other shape. Surface diffusers with lenticular patterns function as a diffuser and are advantageous for hiding seams. Bulk diffusers are typically made by mixing together immiscible materials having a slightly different index-of-refraction such that small particles or lenses are formed in the bulk of the material. A textured front surface can help avoid front surface glare.

Asymmetric diffusion in the horizontal and vertical direction (X and Y) is advantageous because the horizontal direction typically covers more viewing area to account for the horizontal screen geometry and horizontally distributed probability of viewing locations. The bulk or surface diffusion methods can provide asymmetric diffusion in the X and Y directions. Other methods of making asymmetric diffusers include adding oriented glass fibers such that there is an index-of-refraction difference between the glass fibers and the plastic or adhesive matrix which captures them, adding narrow air chambers such that the air forms cylindrical lenses inside a plastic or adhesive sheet and using a plastic sheet with lines embossed or brushed on the surface. Other asymmetric diffusers are shown below in FIG. 18.

Asymmetry in the direction of the viewer (z) may also be advantageous and may be achieved with a microlens which focuses the incoming light so that when reflected from the screen, it passes through a relatively small spot having high diffusion or beam spreading, as shown in FIGS. 10A and 10B. This z asymmetry increases the contrast ratio and reduces the effect of large angles on the multilayer interference coating. Z asymmetry may be achieved by continuously varying the microlenses on the screen as a function of their position as shown in FIG. 10B. Another way to achieve z asymmetry is to orient a rough surface of high-index-of-refraction material so that the bumps face away from the projector. This arrangement causes the light exiting from the screen to be diffused less than the light entering the screen. A simple way to make such a screen is to make an air gap internally between the rough surface and the dichroic surface. Another approach is to use a low index-of-refraction adhesive to bond the rough high-index-of-refraction material to form an immersed surface diffuser. Two layers each of low index-of-refraction adhesive (silicone pressure-sensitive adhesive at 1.41) and rough high index-of-refraction material (polycarbonate at 1.58) may be advantageous to achieve sufficient diffusion. Taller bumps or a greater difference in index-of-refraction may allow sufficient diffusion to be obtained from one immersed diffuser. Another approach to make an immersed diffuser is to use a high-index-of-refraction adhesive and low-index-of-refraction bumps. Thermoplastic adhesives can reach an index-of-refraction as high as 1.71.

Another method for improving the diffusion characteristics is to use matte diffusers for one or more of the diffusers of FIGS. 13, 14, and 17. Matte diffusers have surfaces that appear flat and planar but rough. Matte diffusers having surface irregularities with amplitudes a (see FIG. 16A) in the range of 1-5 micrometers and periods p (see FIG. 16A) in the range of 10-50 micrometers are suitable. Matte diffusers can take a number of forms. In one form, a matte diffuser can be substrate material with a matte surface. In another form, a matte diffuser can be a substrate coated with a thin diffusing coating.

For the surface diffusers, a further improvement in glare reduction may be achieved by using a multilayer interference antireflection (AR) coating alone or in combination with an antiglare coating.

Referring again to FIGS. 15 and 16, applying pressure sensitive adhesives in the cured state to irregular surfaces such as matte surfaces may result in air bubbles such as air bubble 144 being trapped in the adhesive matrix. The air bubbles may have an undesirable effect on the diffusion such as diffusing light into high angles, where it is wasted. The air bubbles can migrate over time, which results in a less stable diffusion pattern. If the pressure sensitive adhesive is applied in an uncured state, undesirable bubbles are not as likely to form, as shown in FIGS. 15 and 16, thus providing more stability over time and more predictable diffusion characteristics.

The diffusing elements and selective reflecting elements can be combined into a single multiband multilayer interference device containing a DMLI (diffusing multi-layer interference) structure. As shown in FIG. 12, the coating thickness of the layers of the etalon structure may be non-uniform, on a microscopic scale, across the screen surface. Since the wavelength bands that are reflected are related to the coating thickness, if the thicknesses of the coating layers are non-uniform, the wavelength bands selectively reflected may differ also differ on a microscopic scale across the screen. However, the differences are on a small enough scale that they are not detectable by the human eye. The width of the wavelength bands of greater reflectance compares very favorably with non-DMLI structures. DMLI structures can be constructed to selectively reflect or transmit either single or multiple bands of optical energy. Advantages of a DMLI over other forms of MLI are discussed below in the discussion of FIG. 18B.

Beneficial polarization filtering may be achieved with a linear polarizer in the screen. The projector is polarized preferably in the same direction for all three primary colors. Typical transmissive liquid-crystal-display (LCD) projectors are not polarized this way and may be modified by rotating the green polarization with a ½ wave retarder. In the case of digital-micromirror-device (DMD) projectors, a polarization recovery system may be used to keep high light throughput while making the three primary colors polarized. Another approach is to use a liquid-crystal-on-silicon (LCOS) projector which inherently has the same polarization for all three primary colors.

A conventional polarizer may be may include a polarizing film made by stretching polyvinyl alcohol (PVA) and then dyeing it to transmit light of one polarization while absorbing light of the other polarization. The polyvinyl alcohol is typically approximately 0.001" thick. On one or both sides, cellulose triacetate (CTA) or cellulose acetate butyrate (CAB) layer is added to protect and strengthen the polarizer. These protective layers are typically at least 0.001" thick each. "Birefringence" is a property of materials that describes a different index-of-refraction along different orientations of the material. Plastic film materials used in the screen preferably have controlled birefringence to retain proper polarization. To combat uncontrolled birefringence the film may be oriented such that the birefringence does not cause rotation of the polarized light from the projector. Another way is to use substrate materials, such as CTA or CAB, which have very low birefringence. Special adhesive with very low birefringence may also be used. In particular, the diffuser substrate and adhesives in front of the dichroic filter preferably have controlled birefringence. The substrate for the dichroic filter and the adhesive behind the dichroic filter do not need to have controlled birefringence because light passing through these rear materials is discarded.

"Extinction ratio" is a measure of the amount of light passed through two polarizers aligned with their polarization axes aligned perpendicular divided by the amount of light passed through two polarizers aligned with their polarization axes aligned parallel. A modest extinction ratio is acceptable to achieve large benefit from including a polarizer in the projection screen. Low cost polarizers, such as the grades made for sunglasses or toys, are sufficient for the invention.

Another way to provide beneficial polarization is by using a polarizing coating, such as the coating described in U.S. Pat. No. 5,739,296. A suitable polarizer could be made from a polarizing coating deposited directly on a plastic film or on an MLI coating. Using a polarizing coating is advantageous because a polarizer including a polarizing coating can be made thinner and cheaper than a conventional polarizer, and because it performs better at high angles than conventional polarizers.

Another way to achieve spectral selectivity in the screen is to use a phase retarder that is able to control polarization direction as a function of wavelength. The phase retarder can be put in the projector and can consist of one or many elements. Beneficial polarization states are achieved when the red, green, and blue colors are rotated to be (for example) vertical polarization and the other colors are rotated to be horizontal polarization. The polarizer in the screen is oriented so that it selectively allows the reflection of the red, green, and blue while absorbing the other colors. The unpolarized ambient light is partially absorbed so the improvement in contrast ratio and color is similar to that obtained from the multilayer interference coating. This method can be used alone or together with the multilayer interference coating. Phase retarders can also be put in the screen to further modify or enhance the spectral selectivity effects.

Referring to FIG. 13, there is shown an advantageous embodiment of the invention. The top layer 31 is a holographically-mastered diffuser coating deposited on CTA 32. This layer is then attached with low-birefringence transparent adhesive to a polarizer 33 of substantially flat spectral performance. The polarizer 33 is then attached with another layer of low-birefringence transparent adhesive to the dichroic filter 34. The dichroic filter 34 typically comprises sputter-coated layers of $SiO_2$ and $Nb_2O_5$ on a polyester terephthalate (PET) film. The dichroic filter 34 is attached to a black PET film 36. Typical thicknesses are as follows: 0.003" diffuser, 0.001" adhesive, 0.001" polarizer, 0.001" adhesive, 0.003" dichroic on PET film, 0.001" adhesive and 0.001" black PET. The total thickness is approximately 0.011", which is thin enough to allow the easy rolling and deployment of the screen.

Referring to FIG. 14, there are shown two examples of more advanced versions of the invention characterized by reduced cost and thickness. In FIG. 14A the top layer is a holographically-mastered diffuser coating 41 deposited directly on the polarizer 42. The dichroic filter 43 includes absorbing materials and is deposited directly on the bottom of the polarizer 42. Typical thicknesses are as follows: much less than 0.001" diffuser, 0.003" polarizer, much less than 0.001" dichroic coating. The total thickness is thus approximately 0.003". In FIG. 14B, one immersed surface diffuser is included. Other combinations can be realized by incorporating only some of the advanced approaches in FIG. 15.

Figure 15B:
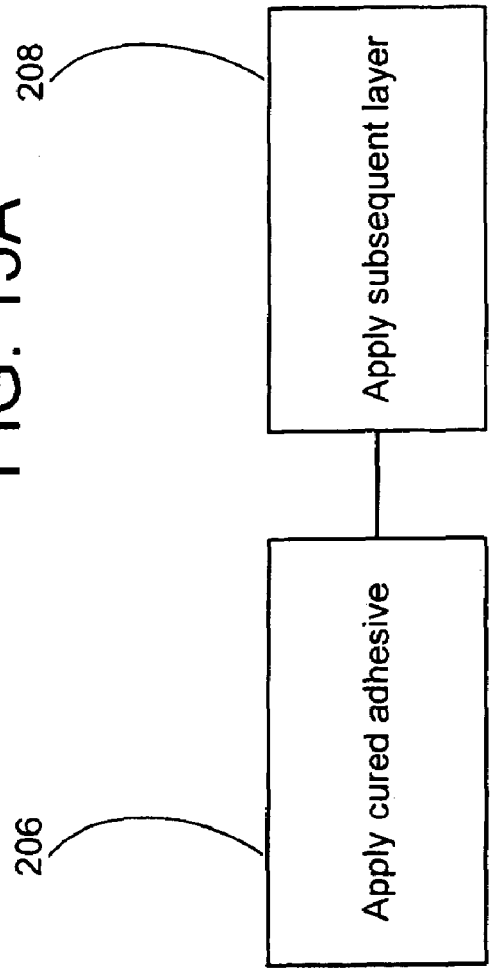
FIG. 15B is a block diagram of a process for providing the structure of FIG. 15A.

The construction shown in FIG. 15B puts the diffuser primarily behind the polarizer. This construction results in higher "contrast ratio improvement" (CRI), because ambient light does not have a chance to directly reflect from the diffuser before being partially absorbed in the polarizer. In this embodiment, the surface bumps are still used to prevent surface glare. The immersed diffuser may be bulk or surface type with X-Y asymmetric properties.

The construction shown in FIG. 17A advantageously combines a multilayer, multiband, single stack MLI as a selective reflector; a matte surface embedded diffuser; a conventional polarizer; and adhesive that is applied in the uncured or "b-stage" state and then cured (hereinafter referred to as "cured b-stage adhesive").

The construction shown in FIG. 17B advantageously combines a DMLI with an asymmetric diffusion pattern, a polarizer including a polarizing coating; and cured b-stage adhesive. The use of the etalon type MLI filter eliminates the need for a separate absorber and the use of a DMLI structure may also eliminate the need for an embedded diffuser. The elimination of the separate absorber and the embedded diffuser also may eliminate the need for adhesive layers to laminate the absorber or the embedded diffuser to adjacent components. The elimination of layers and components enables the screen to be thinner and to be made more simply and less expensively.

The construction of FIG. 17C advantageously combines a DMLI structure with a matte substrate of FIG. 17B; a polarizer created from a polarizing coating; b-stage adhesive; and a light shaping diffuser as will be explained below. Matte substrates are desirable because they are readily available in a wide range of compositions and sizes. The use of light shaping diffusers enables the alternate viewing pattern such as shown in FIGS. 23A, 23B, and 23C.

The construction of FIG. 17D includes a DMLI structure using a matte diffuser, a conventional polarizer, and a patterned diffuser that diffuses asymmetrically. Conventional polarizers may be advantageous in some situations, because they are readily available.

The construction of FIG. 17E includes a DMLI structure with a diffusing substrate, a conventional polarizer, and the matte diffuser. The construction of FIG. 17E may be desirable because the asymmetric diffusion may be provided by the diffusing substrate of the DMLI substrate, enabling the use of a readily available matte diffuser for the front diffuser. The substrates, diffusers, and conventional polarizers of FIGS. 17A-17E are advantageous to use because they are readily available and can be processed by known techniques.

The construction of FIG. 17F includes a DMLI structure using a diffusing substrate as one of the reflecting elements and a polarizer/diffuser that is formed with a single substrate. The construction of FIG. 17F is desirable because it is very thin and has fewer adhesive layers than other constructions. The use of a reflective diffusing substrate is advantageous because its use may eliminate the need for a reflective layer. The construction of FIG. 17F can also use the polarizer of FIG. 17C. The polarizer of FIG. 17F is advantageous because it eliminates the need for one of the adhesive layers. The polarizer of FIG. 17C is advantageous because it can be made with a simpler manufacturing process.

Any of the constructions of FIGS. 17A-17F can include conventional cured adhesive in place of b-stage adhesive. The advantage of b-stage adhesive has been stated elsewhere. The advantage of conventional cured adhesive is greater commercial availability.

Many other combinations of substrates, MLI and DMLI structures, embedded diffusers, adhesive layers, and polarizers are possible. As has been noted in the discussions above, the use of some combinations may permit the omission of some of the layers or components. The specific combination may be selected on the basis of cost, performance, ease of manufacture, commercial availability of materials, and other considerations.

In one form of the invention, it is advantageous to use narrow-band light sources. The sources may be gas or semiconductor diode lasers. Throughout most of this invention description, the wavelengths specified have been based on a specific projector embodiment which uses UHP bulbs to comprise the light source. If a different light source is used, the wavelengths may be adjusted appropriately. In particular, the green wavelength may be shifted to a more purely green color near approximately 520 nm. The output spectrum from a typical projector (with additional filtering that removes the UHP yellow peak), which is appropriate for use with the wavelength selective projection screen, is shown in FIG. 18. UHP bulbs tend to be red poor, so a combination of a UHP bulb with another source of narrow-band red is advantageous. A large number of LEDs may be used to provide the red light. Another source may be a filtered tungsten filament bulb. The CRI may be used as a measure of the effect of the high contrast projection screen according to the invention. With a reasonably narrow-band projector light, typical ultra-high-pressure (UHP) mercury vapor lamp, yellow filtered out, the measured CRI of exemplary high contrast screens range from about 3.5 to about 4.5, depending on the amount of spreading desired. A CRI of 4 is reasonable with typical spreading angles of approximately 45 degrees vertical by 65 degrees horizontal (full angle, half power). These number are for a well-lighted room where a white screen has a contrast ratio of 10 to 1, which makes a picture that is very difficult to see. In that situation, the new system will improve the contrast ratio to approximately 40 to 1, which is a satisfactory level for front projection systems. In a dark room, the invention still provides color improvement and absorbs a significant fraction of the projector's stray light which reflects off the screen and bounces off the walls. That light is largely depolarized when it reflects off the walls, so the polarizer in the screen is still usable in improving contrast ratio. Also, the light that reflects off the walls is largely redirected to high angles where the screen dielectric coating and diffusers are constructed and arranged to avoid returning ambient light to the viewer.

Referring to FIG. 19, there is shown a color chart with the colors labeled and the corresponding wavelengths indicated. Referring to FIG. 21, there is shown the effect of color improvement. The triangle marked "1" is the color gamut on a white screen produced by a Viewsonic PJ1060 projector (with modified polarization and typical settings for high contrast). The triangle marked "2" shows the color gamut of the same situation except with the addition of a moderately narrow band RGB filter at the output of the projector. The triangle marked "3" shows the color gamut with the further addition of the wavelength selectable projection screen according to this invention. In this example, the addition of the narrow band filter and screen results in a 53 percent improvement in color gamut area.

FIG. 20 shows that this invention has moved the blue point from approximately U'=0.18, V'=0.13 to approximately U'=0.21, V"=0.08. This change represents a shift that makes the blue color become purplish. In order to correct the blue color and to achieve an even larger color gamut, it is advantageous to reduce the reflection in the range of 430 to 450 nm. This reduction can be achieved by appropriate construction of a multilayer coating or by the use of dyes. Changing the blue will tend to degrade the desirable neutral gray or slightly purplish color of the screen when reflecting only ambient light. Other changes, such as a reduction in the amount of green reflection, may be advantageous to keep the proper ambient color.

The high contrast projection screen according to the invention significantly increases the contrast ratio and improves the color. The multilayer interference coating is advantageous in obtaining sharp cut-on and cut-off slopes in wavelength selection. Also, it can be made with arbitrary positions for the cut-ons and cut-offs. This feature allows adjustment for better color and contrast ratio. Colorants such as dyes offer general insensitivity to incoming and outgoing light angles, making them especially advantageous to the projection screen environment.

A variety of methods may be used to reduce the effect of high-angle-of-incidence light on the interference coating. One approach is to coat the screen nonuniformly so that each position on the screen has a preshifted coating that compensates for the angle of incidence at that position. Another approach is to curve the screen so that the angle stays more nearly constant. It is preferred that a lamp of known source spectral power density be matched to a colored screen with the desired emission properties. Other primary color schemes may be used beside RGB to create a full color display. In fact, many colors can be created from a two-primary color system. Another approach is to use only one color to make a monochrome display. The monochrome system can be designed with fewer layers in the dichroic or can be designed to enhance contrast more than in the full color system.

An alternative way to utilitize the multilayer interference coatings include the method of removing the coating flakes from the substrate, grinding them into smaller pieces, and putting them into a binder to make paint. The advantages of this method are much improved coating uniformity across the screen and added diffusion from the interference coating flakes that may allow the elimination of the internal diffuser.

Figure 21B:
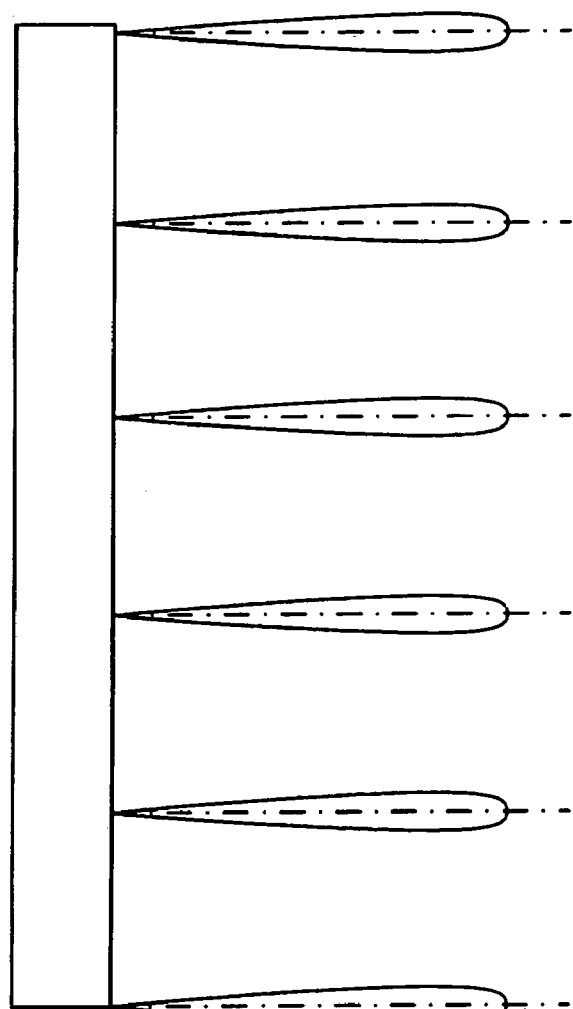

The reflection patterns of FIGS. 21A and 21B illustrate some features of the diagrams of FIGS. 22 and 23. A reflection pattern as shown in 21A has lobes that are semi-circular, indicating that light is uniformly reflected in all directions. A screen with a reflection pattern such as 21A has a very wide viewing angle, but is likely to lack sufficient brightness to be viewed in a room with ambient light. A screen with a reflection pattern of 21B, with a narrow lobe 200 is very bright along the axis 198 of the lobe 200, but has a very narrow viewing angle and is subject to glare.

The reflection pattern of FIG. 22 has adequate brightness across the horizontal viewing area 238, a sufficient viewing angle, and has a sufficiently diffuse reflection pattern so that there is not excessive glare.

The reflection pattern of FIG. 23A reflects more light to the horizontal viewing areas 238 than to the non-viewing area 240 in the vicinity of the projector 130.

The reflection pattern of FIG. 23B is useful for situations in which the screen is above the viewer. The reflection pattern of FIG. 23C uses the techniques of FIG. 23B in the horizontal plane and permits a larger horizontal viewing area 240 than the implementation of FIG. 23A.

The viewing patterns shown in FIGS. 23A, 23B, and 23C can be created by using a light diffuser such as the light shaping diffuser 182 of FIG. 18C. Suitable light shaping diffusers are available commercially from the Physical Optics Corporation of Torrance, CA (Internet address www.poc.com) under the trademark LSD® light shaping diffusers, from 3M Corporation of St. Paul, Minn., under the trademark Vikuity™ display enhancement films, or with prismatic screen surfaces. Screens with viewing patterns according to FIGS. 23A, 23B, and 23C are advantageous because they reflect more of the light to locations in which there are viewers and less light to locations in which there are no viewers.

Additional information concerning projection screens is set forth in U.S. patent application Ser. No. 10/789,688 entitled "Display Screens," filed on the same day as this application and incorporated here by reference in its entirety.

It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. An optical device, comprising:
    a projection screen, comprising
    a first broadband reflective layer;
    a second broadband reflective layer;
    substantially continuous layers of dielectric material, each layer consisting essentially of a material having a different index of refraction (n) than the material of an adjacent layer, the layers disposed between the first reflective layer and the second reflective layer, constructed and arranged so that an optical output of the optical device includes substantially more light with wavelengths in a plurality of narrow wavelength bands than light with wavelengths not in the plurality of wavelength bands.

2. An optical device in accordance with claim 1, wherein the first reflective layer is highly reflective so that the optical output is reflected light with wavelengths in the plurality of narrow wavelength bands.

3. An optical device in accordance with claim 2, wherein the first reflective layer comprises aluminum.

4. An optical device in accordance with claim 1, wherein the first reflective layer is partially reflective so that the optical output comprises transmitted light with wavelengths in the plurality of narrow wavelength bands.

5. An optical device in accordance with claim 1, wherein the first reflective layer comprises a substrate comprising a reflective material.

6. An optical device in accordance with claim 5, wherein the first reflective layer comprises a diffuser.

7. An optical device in accordance with claim 6, wherein the first reflective layer comprises aluminum.

8. An optical device in accordance with claim 1, wherein the first reflective layer comprises a diffuser.

9. An optical device in accordance with claim 1, wherein the device has a width, height, and thickness and wherein the width and the height are greater than seven inches.

10. A method comprising
    at a projection screen receiving projected light and ambient light, processing the light, and preferentially reflecting portions of the light that are within at least two narrow spectral bands relative to reflection of light that is not within the narrow spectral bands, the processing occurring within consecutive layers of higher and lower index-of-refraction materials
    wherein the processing the light comprises reflecting the light, by a first and second broadband reflective layer constructed and arranged so that the consecutive layers of higher and lower index of refraction materials are between the first and the second reflective layer, so that light with wavelengths not in the plurality of narrow bands of wavelengths destructively interferes.

11. A method in accordance with claim 10, further comprising polarizing, by a projector, so that the projected light has substantially more light of one linear polarization than of another linear polarization and
    polarizing, by the screen, of the projected light and the ambient light so that the screen reflects substantially more of the light of the one linear polarization and absorbs light of the second linear polarization.

12. A method in accordance with claim 10, further comprising projecting the light by a projector that is constructed and arranged to project substantially more light with wavelengths in the plurality of narrow bands of wavelengths than light with wavelengths not in the plurality of narrow bands.

13. An optical device, comprising:
    a projection screen, comprising
    a first reflective layer and a second reflective layer for reflecting light toward each other through substantially continuous layers of dielectric material, each layer consisting essentially of a material having a different index of refraction (n) than the material of an adjacent layer, so that light of at least one wavelength band destructively interferes in a space between the first reflective layer and the second reflective layer, so that incident light of said at least one wavelength band is attenuated by the device.

14. An optical device comprising:
    a projection screen comprising
    a first reflective layer and a second reflective layer for reflecting light toward each other through substantially continuous layers of dielectric material, each layer consisting essentially of a material having a different index of refraction (n) than the material of an adjacent layer, so that light of at least one wavelength band destructively interferes in a space between the first reflective layer and the second reflective layer, so that incident light of said at least one wavelength band is attenuated by the device, wherein the first reflective layer and the second reflective layer reflect light of all wavelength bands in the visible spectrum.

15. An optical device, comprising:
    a projection screen, comprising
    a first reflective layer and a second reflective layer, for reflecting light of substantially all wavelengths in the visible spectrum; and substantially continuous layers of dielectric material, each layer consisting essentially of a material having a different index of refraction (n) than the material of an adjacent layer, the layers disposed between the first reflective layer and the second reflective layer, constructed and arranged so that an optical output of the optical device includes substantially less light with wavelengths in at least one wavelength bands than an optical input to the optical device.

* * * * *